US006917584B2

(12) United States Patent
Kuwabara

(10) Patent No.: US 6,917,584 B2
(45) Date of Patent: Jul. 12, 2005

(54) CHANNEL REASSIGNMENT METHOD AND CIRCUIT FOR IMPLEMENTING THE SAME

(75) Inventor: Takashi Kuwabara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 846 days.

(21) Appl. No.: 09/810,240

(22) Filed: Mar. 16, 2001

(65) Prior Publication Data

US 2002/0057679 A1 May 16, 2002

(30) Foreign Application Priority Data

Sep. 22, 2000 (JP) ........................................ 2000-289230

(51) Int. Cl.[7] .............................................. G01R 31/08
(52) U.S. Cl. ...................................... 370/225; 370/437
(58) Field of Search ................................ 370/215, 216, 370/217, 218, 219, 220, 225, 227, 228, 242, 244, 247, 248, 250, 251, 252, 253, 401, 402, 403, 431, 433, 437, 468, 222, 223, 224, 404, 405, 406

(56) References Cited

U.S. PATENT DOCUMENTS 5,467,344 A * 11/1995 Solomon et al. ............. 370/396
6,122,250 A * 9/2000 Taniguchi .................... 370/222
2003/0076831 A1 * 4/2003 Van Doren et al. .......... 370/394

FOREIGN PATENT DOCUMENTS

| JP | 04345225 | 12/1992 |
| JP | 08065262 | 3/1996 |

* cited by examiner

Primary Examiner—Phirin Sam
(74) Attorney, Agent, or Firm—Katten Muchin Zavis Rosenman

(57) ABSTRACT

A channel reassignment is accomplished without causing a momentary interruption resulting from a mismatch in pointer value. After a bridge setting is made between a source channel and destination channel at a first node designated as the starting point of a reassignment section, messages B/C are sent out from the first node toward a fourth node designated as the end point. Second and third nodes that received the message C each transfer the message to the next node after interlinking the pointer operation of the destination channel with the source channel. The fourth node that received the message C sends out a message D toward the first node after changing the setting of a TSA. The second and third nodes that received the message D transfers the message to the next node after clearing the pointer interlinking operation.

7 Claims, 26 Drawing Sheets

Fig.1

| CH1 | CH2 | CH3 |
|------|------|------|
| CH4 | CH5 | CH6 |
| CH7 | CH8 | CH9 |
| CH10 | CH11 | CH12 |

Fig.2

| CH1 | CH2 | CH3 |
|------|------|------|
| CH4 | CH5 | CH6 |
| CH7 | CH8 | CH9 |
| CH10 | CH11 | CH12 |

Fig.9

| | b1 | b2 | b3 | b4 | b5 | b6 | b7 | b8 |
|---|---|---|---|---|---|---|---|---|
| Z1#7 | D7 | D6 | D5 | D4 | D3 | D2 | D1 | D0 |
| Z1#8 | D7 | D6 | D5 | D4 | D3 | D2 | D1 | D0 |

| CODE | SPECIFIES REASSIGNMENT START-POINT NODE (Z1#7) | SPECIFIES REASSIGNMENT END-POINT NODE (Z1#8) |
|---|---|---|
| 00h | NO REQUEST | NO REQUEST |
| 01h | 1ST NODE | 1ST NODE |
| 02h | 2ND NODE | 2ND NODE |
| ----- | ----- | ----- |
| FFh | 255TH NODE | 255TH NODE |

Fig.10

|  | Z1#9 | Z1#10 |
|---|---|---|
|  | b1 b2 b3 b4 b5 b6 b7 b8 | b1 b2 b3 b4 b5 b6 b7 b8 |
| CODE | D15 D14 D13 D12 D11 D10 D9 D8 | D7 D6 D5 D4 D3 D2 D1 D0 |
|  | SPECIFIES SOURCE CHANNEL | OC-768 \| OC-192 \| OC-48 \| OC-12 |
| 0000h | NO REQUEST / CONNECTION VERIFICATION / CLEAR REQUEST [RESPONSE] | |
| 0001h | SPECIFIES CH1 | |
| 0002h | SPECIFIES CH2 | |
| ... | | |
| 000Ch | SPECIFIES CH12 | NO REQUEST |
| 000Dh | SPECIFIES CH13 | |
| ... | | |
| 0030h | SPECIFIES CH48 | |
| 0031h | SPECIFIES CH49 | NO REQUEST |
| ... | | |
| 00C0h | SPECIFIES CH192 | |
| 00C1h | SPECIFIES CH193 | NO REQUEST |
| ... | | |
| 0300h | SPECIFIES CH768 | |
| 0301h | NO REQUEST | |
| ... | | |
| FFFEh | CANCEL REQUEST [RESPONSE] | |
| FFFFh | | |

Fig.11

| | Z1#11 | | | | | | | | Z1#12 | | | | | | | |
|---|---|---|---|---|---|---|---|---|---|---|---|---|---|---|---|---|
| b1 | b2 | b3 | b4 | b5 | b6 | b7 | b8 | b1 | b2 | b3 | b4 | b5 | b6 | b7 | b8 |
| D15 | D14 | D13 | D12 | D11 | D10 | D9 | D8 | D7 | D6 | D5 | D4 | D3 | D2 | D1 | D0 |

| CODE | SPECIFIES DESTINATION CHANNEL | | |
|---|---|---|---|
| | OC-768 | OC-192 | OC-48 | OC-12 |
| 0000h | NO REQUEST/CONNECTION VERIFICATION/CLEAR REQUEST [RESPONSE] | | | |
| 0001h | | SPECIFIES CH1 | | |
| 0002h | | SPECIFIES CH2 | | |
| ...... | | | | |
| 000Ch | | SPECIFIES CH12 | | |
| 000Dh | | | SPECIFIES CH13 | |
| ...... | | | | |
| 0030h | | | SPECIFIES CH48 | |
| 0031h | | | | SPECIFIES CH49 |
| ...... | | | | |
| 00C0h | | | | SPECIFIES CH192 |
| 00C1h | | | NO REQUEST | SPECIFIES CH193 |
| ...... | | | | |
| 0300h | | | SPECIFIES CH768 | |
| 0301h | | NO REQUEST | | |
| ...... | | | | |
| FFFEh | | | | |
| FFFFh | CANCEL REQUEST [RESPONSE] | | | |

Fig.12

| | PROTOCOL | Z1#7 | Z1#8 | Z1#9 - #10 | Z1#11 - #12 |
|---|---|---|---|---|---|
| | | START-POINT NODE | END-POINT NODE | SOURCE CHANNEL | DESTINATION CHANNEL |
| A | NO REQUEST (STANDBY STATE) | 00h | 00h | 0000h | 0000h |
| B | CONNECTION VERIFICATION [TRANSMIT] | START-POINT NODE | END-POINT NODE | 0000h | 0000h |
| C | REASSIGNMENT REQUEST [TRANSMIT] (INTERLINK OPERATION AND SWITCHING) | START-POINT NODE | END-POINT NODE | SOURCE CH | DESTINATION CH |
| D | CLEAR REQUEST [RESPONSE] (NORMAL TERMINATION) (RESPONSE) | START-POINT NODE | END-POINT NODE | 0000h | 0000h |
| E | CANCEL REQUEST [RESPONSE] (ABNORMAL TERMINATION) (RESPONSE) | START-POINT NODE | INTERMEDIATE NODE | FFFFh | FFFFh |

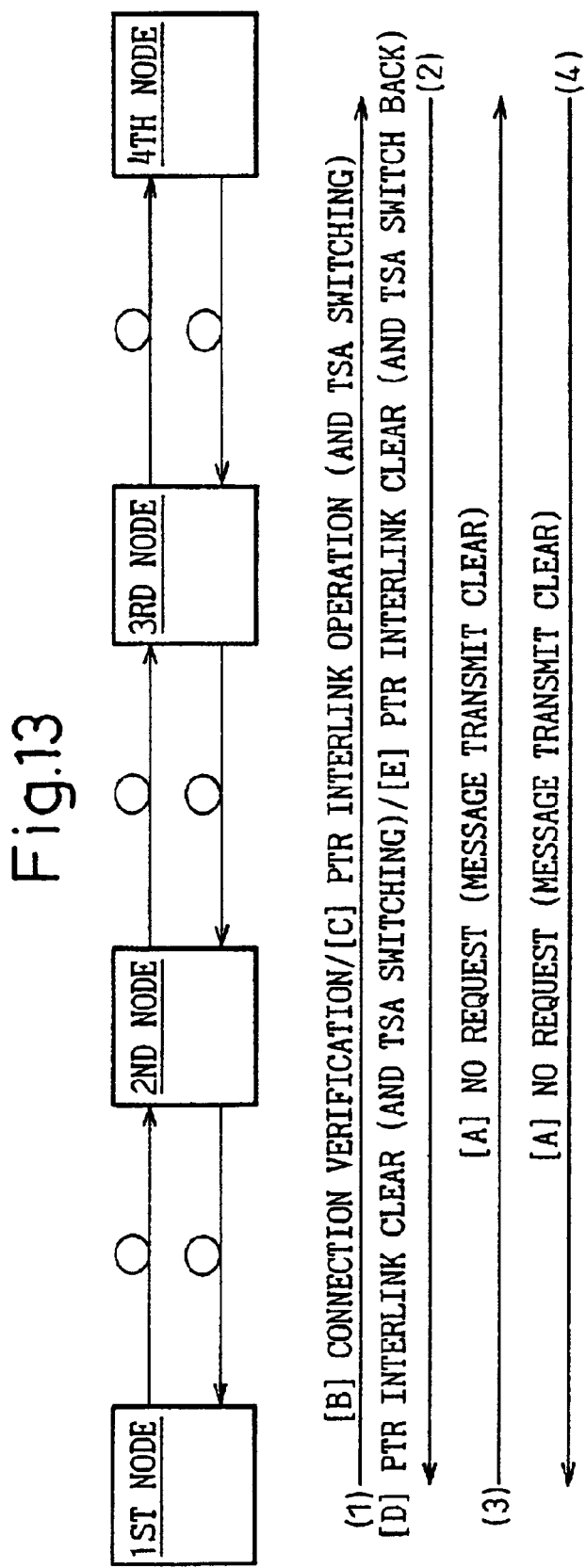

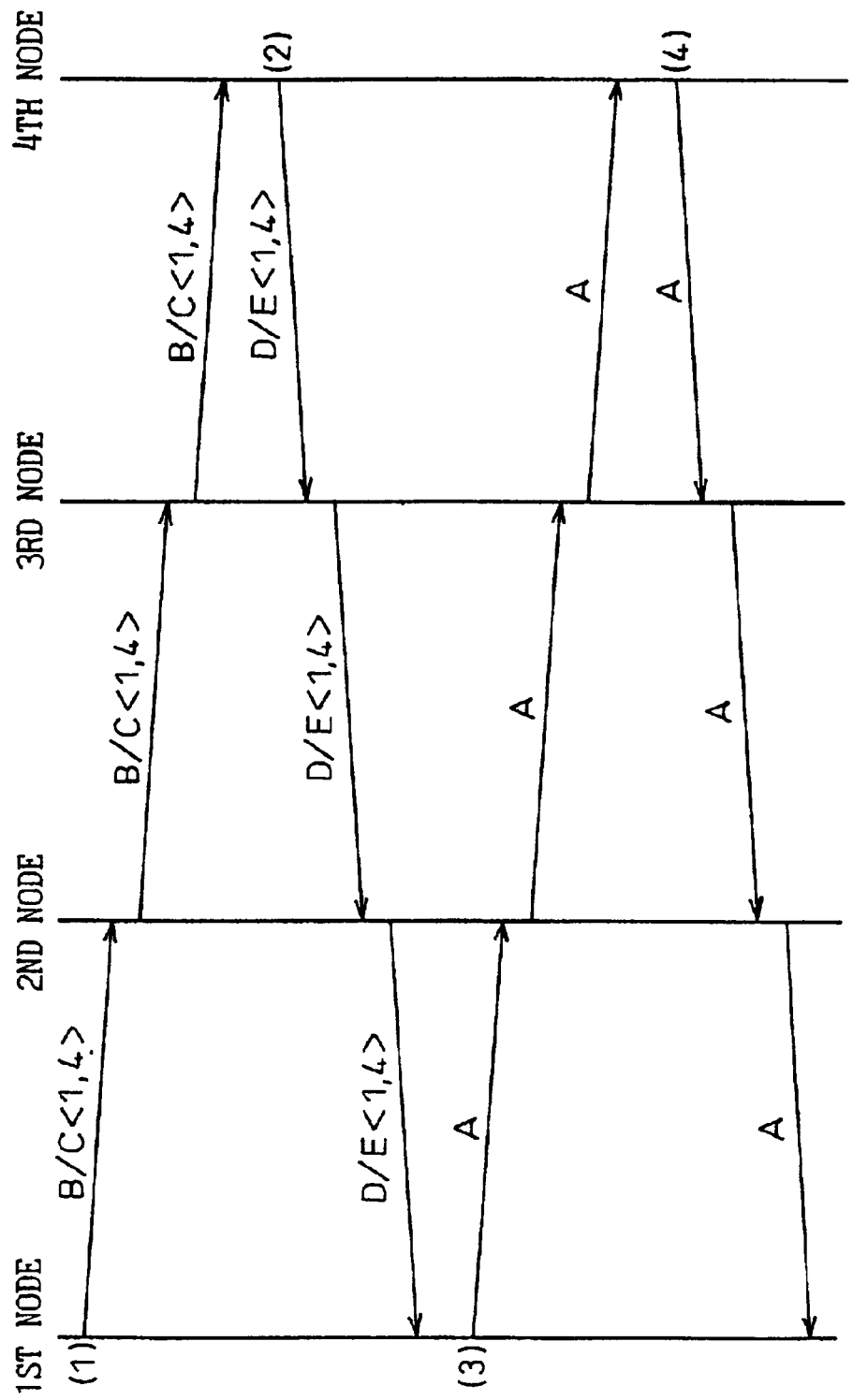

CHANNEL REASSIGNMENT METHOD AND CIRCUIT FOR IMPLEMENTING THE SAME

BACKGROUND OF THE INVENTION

1. Field of the Invention

The present invention relates to a method for performing the reassignment (channel reassignment) of TSA (Time Slot Assignment) at the high-rate signal side, uninterruptedly, in a SONET/SDH optical transmission system, and a circuit for implementing such a method.

2. Description of the Related Art

In recent SONET/SDH optical transmission systems, the need for higher-speed, higher-capacity transmission apparatuses is increasing with increasing demand for communication channels in the information society. On the other hand, the recent rapid development of information services such as the Internet and electronic mail has been supported by increased speeds and increased capacities of IP routers and other equipment indispensable for the processing of such services. With such high-capacity equipment located at the primary-rate signal side, optical transmission apparatuses that perform multiplexing must handle correspondingly larger-capacity signals. Accordingly, the capability to flexibly cope with the increased capacity of equipment at the primary-rate signal side is particularly required of recent optical transmission apparatuses and systems.

In this case, since the concatenation of channels to accommodate large-capacity primary-rate signals cannot be performed on a plurality of arbitrary channels, there are certain cases in which the channel assignments at the higher rate signal side must be changed.

For example, consider the case where an OC-3 (or STS-3c) is to be accommodated on an OC-12 having 12 channels each accommodating a SONET OC-1 (or STS-1). When accommodating an OC-3 (STS-3c) on an OC-12, a concatenated area for accommodating the OC-3 must be created by concatenating CH1–CH3, CH4–CH6, CH-7–CH9, or CH10–CH12. Therefore, if a new STS-3c is to be accommodated in a section where the positions shown by hatching in FIG. 1 are occupied as shown, the signal occupying CH8 must be reassigned and moved to CH6 in order to create a concatenated area for accommodating the new STS-3c, as shown in FIG. 2. By changing the assignment in the section where the new STS-3c is to be accommodated, as shown in FIG. 2, CH7–CH9 can be concatenated to accommodate the STS-3c.

In prior art optical transmission systems, by performing such TSA reassignment (channel reassignment) in accordance with the following sequence of operations, the channel reassignment can be accomplished without having to cut the channels currently used for services for a long period of time.

(a) In the transmitting optical transmission apparatus, the signal on the source channel (CH8 in the above example) is also output onto the destination channel (CH6 in the above example). [Bridge setting]

(b) In the receiving optical transmission apparatus, the signal receiving channel is changed from CH8 to CH6. [Switching]

(c) In the transmitting optical transmission apparatus, transmission of the signal onto CH8 is stopped. [Bridge clearing]

In SONET/SDH optical transmission systems, pointer circuits are provided to prevent data dropout or duplication by absorbing minute differences in clock frequencies between different optical transmission apparatuses. The pointer circuit has an ES (elastic store) memory for temporarily storing payload data, and absorbs the minute differences of clock frequencies by changing the payload insertion position in a frame at the transmitting end based on the phase difference between its write address and read address.

The pointer processing by the pointer circuit is performed independently for each channel, except between concatenated channels. As a result, even if the phase of the payload (J1 phase) at the transmitting end is kept aligned between the source channel and the destination channel after the bridge setting in (a), the J1 phase at the receiving end will be shifted after undergoing the pointer processing at each intermediate node.

Accordingly, because of the switching operation in (b) at the receiving end, duplicated transmission of data or data dropout will occur, resulting in a momentary interruption of the signal. This momentary signal interruption is caused, not due to the switching operation itself, but due to the pointer processing along the path to the receiving end, and therefore cannot be avoided even if the switching operation usually controlled with asynchronous timing is synchronized to the main signal timing. Further, since the data duplication and dropout described above are inherently due to a difference in pointer value, restoration from the interruption must wait until the normal pointer of the channel after the switching is received three times in succession.

SUMMARY OF THE INVENTION

It is accordingly an object of the present invention to provide a method for performing channel reassignment uninterruptedly, and a circuit for implementing the same.

According to the present invention, there is provided a channel reassignment method comprising the steps of: (a) at a starting point of a reassignment section, making a bridge setting for transmitting a signal on a source channel also onto a destination channel; (b) interlinking the pointer operation of the destination channel with the source channel in all pointer circuits located along the reassignment section; (c) switching the signal from the source channel to the destination channel after performing steps (a) and (b); (d) clearing the pointer interlinking operation effected in step (b) after performing step (c); and (e) clearing the bridge setting made in step (a) after performing step (c).

According to the present invention, there is also provided a pointer circuit for performing pointer processing between receiving and transmitting ends of a plurality of channels, the pointer circuit comprising for each channel: an ES memory temporarily storing payload data of the channel; a phase comparator generating a stuff request by comparing a write address and read address for the ES memory; and a pointer determining unit for determining a pointer at the transmitting end based on the stuff request, wherein the pointer circuit further comprises for each channel: first and second selectors selecting, for a destination channel, a write address and a read address of a source channel as the write address and read address for the ES memory at the time of channel reassignment, and supplying the selected write address and read address to the ES memory; and a third selector for selecting, for the destination channel, a stuff request of the source channel as the stuff request, and for supplying the selected stuff request to the pointer determining unit.

According to the present invention, there is also provided a time slot assignment processing circuit comprising a flip-flop for synchronizing a time slot assignment setting changing signal to a main signal.

BRIEF DESCRIPTION OF THE DRAWINGS

FIG. 1 is a diagram for explaining the necessity for channel reassignment;

FIG. 2 is a diagram for explaining the necessity for channel reassignment;

FIG. 9 is a diagram for explaining first and second bytes in a channel reassignment message;

FIG. 10 is a diagram for explaining third and fourth bytes in a channel reassignment message;

FIG. 11 is a diagram for explaining fifth and sixth bytes in a channel reassignment message;

FIG. 12 is a diagram for explaining channel reassignment messages;

FIG. 13 is a diagram showing a processing sequence for channel reassignment;

FIG. 14 is a diagram showing a processing sequence for channel reassignment;

DESCRIPTION OF THE PREFERRED EMBODIMENTS

Figure 3:
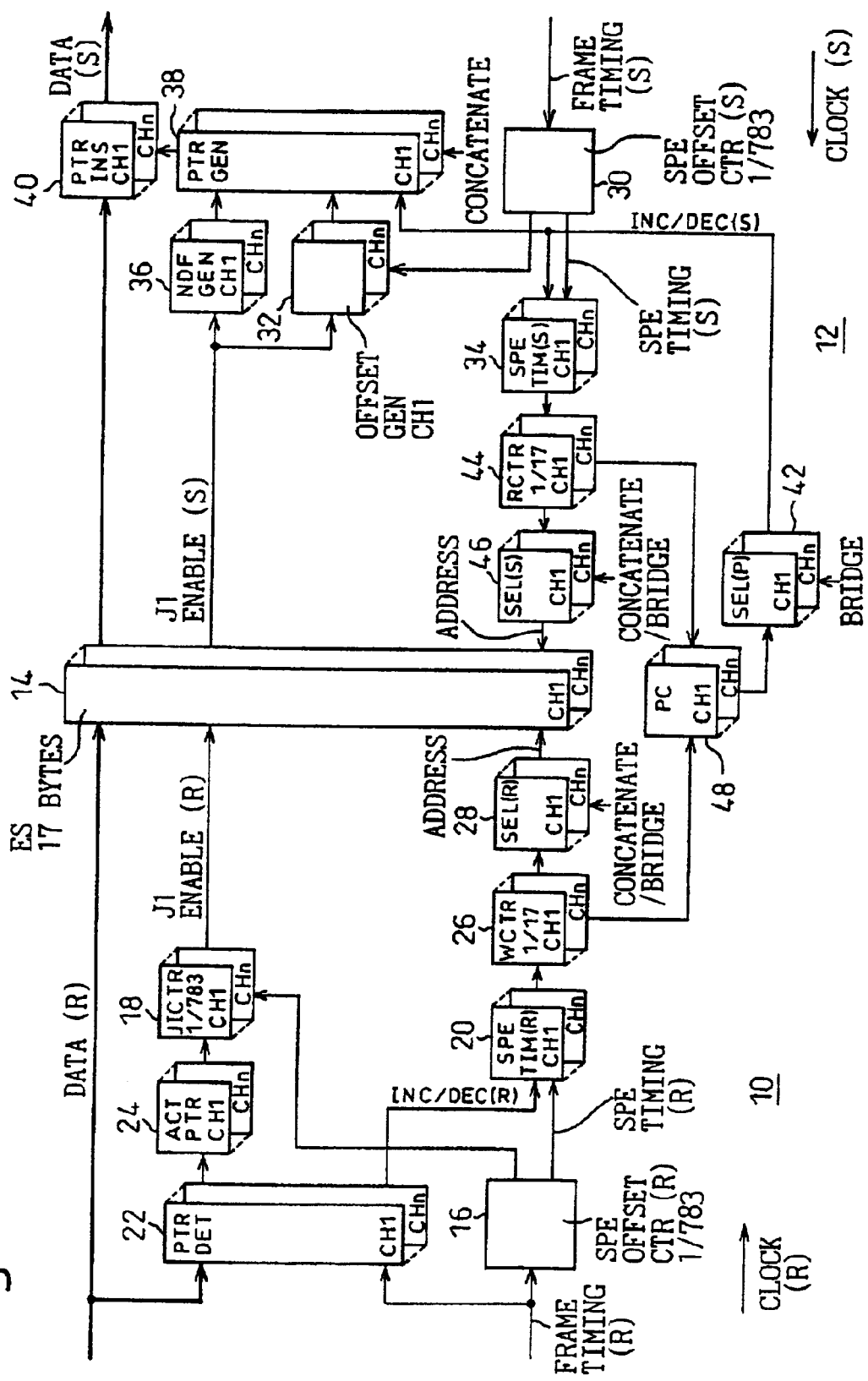
FIG. 3 is a block diagram showing one example of a pointer circuit according to the present invention.

FIG. 3 is a block diagram of a pointer circuit, as one example of the pointer circuit of the present invention, that has a 17-byte ES memory for each STS-1 channel and that handles an STS-n signal. The pointer circuit is roughly divided into two sections, that is, a receiving-side processing section 10 located on the writing side of the ES memories 14 and operating with a receive clock (R) and frame timing (R), and a transmitting-side processing section 12 located on the reading side of the ES memories 14 and operating with a transmit clock (S) and frame timing (S).

First, in the receiving-side processing section 10, an SPE offset CTR(R) block 16 generates, based on the receive frame timing, a 1/783 counter value indicating the offset position of an SPE (Synchronous Payload Envelope), and supplies the counter value to a J1 CTR block 18. Further, it generates an SPE timing (R) signal indicating the location of the SPE in the received data, and supplies the signal to an SPE TIM(R) block 20.

For the processing of the received data, a PTR DET block 22, based on the receive frame timing, extracts H1/H2 bytes from the received data, and supplies them to an ACT PTR block 24 at the next stage. Further, the PTR DET block 22 detects an INC/DEC request (stuff request) from the H1/H2 bytes in the received data, and notifies the SPE TIM(R) block 20.

The ACT PTR block 24 detects an NDF (New Data Flag), stuff request, etc. from the H1/H2 bytes in the received data, and updates the active pointer value.

Based on the SPE offset counter value, the J1 CTR block 18 generates from the active pointer value a J1 enable (R) signal indicating the location of J1 in the received data.

For the generation of the write address of the received data, first the SPE TIM(R) block 20 generates write timing to the ES memory 14 based on the SPE timing (R) indicating the SPE location in the received data, plus the receive pointer INC/DEC(R) information from the PTR DET block 22, and considering the location of the byte (positive stuffing) next to the H3 byte when INC(R) is received or of the H3 byte (negative stuffing) when DEC(R) is received.

A WCTR block 26 at the next stage generates a write address for the ES memory 14 by dividing the write timing by 17. However, the write address generated by the WCTR block 26 does not account for channel concatenations, but an independent write address is generated for each channel.

For a concatenated signal, therefore, to make the write addresses of the subordinate channels match the write address of the leading channel, a SEL(R) block 28 performs processing so that the selectors for the subordinate channels select the write address of the leading channel in accordance with the concatenation setting. Here, in order to interlink the write address of the destination channel with the write address of the source channel in a bridge set state in the process of TSA reassignment, the function of having the selector for the destination channel select the write address of the source channel is added in the SEL(R) block 28.

On the other hand, in the transmitting-side processing section 12, an SPE offset CTR(S) block 30 generates, based on the transmit frame timing, a 1/783 counter value indicating the offset position of an SPE, and supplies the counter value to an offset GEN block 32. Further, it generates an SPE timing (S) signal indicating the location of the SPE in the transmit data, and supplies the signal to an SPE TIM(S) block 34.

For the processing of the transmit data, an NDF GEN block 36 compares the J1 enable (S) signal read from the ES memory 14 with the J1 enable position of the previous frame and, if there is a discrepancy, generates an NDF-enable.

The offset GEN block 32, based on the SPE offset counter value, calculates the offset of the J1 enable position after clock transfer, and generates a 10-bit pointer value.

A PTR GEN block 38 at the next stage generates the H1/H2 bytes for the transmit data, based on the concatenation setting state and on the NDF-enable, 10-bit counter value, and INC/DEC(S) information generated by the respective blocks. A PTR INS block 40 inserts the H1/H2 bytes generated by the PTR GEN block 38 into the main signal data that has undergone clock transfer.

For the generation of the read address of the transmit data, first the SPE TIM(S) block 34 generates the read timing of the ES memory 14 based on the SPE timing (S) indicating the SPE location in the transmit data, plus the transmit pointer INC/DEC(S) information selected by the SEL(P) block 42, and considering the location of the byte (positive stuffing) next to the H3 byte when transmitting INC(S) or of the H3 byte (negative stuffing) when transmitting DEC(S).

An RCTR block 44 at the next stage generates a read address for the ES memory 14 by dividing the read timing by 17. However, the read address generated by the RCTR block 44 does not account for channel concatenations, but an independent read address is generated for each channel.

For a concatenated signal, therefore, to make the read addresses of the subordinate channels match the read address of the leading channel, a SEL(S) block 46 performs processing so that the selectors for the subordinate channels select the read address of the leading channel in accordance with the concatenation setting. Here, in order to interlink the read address of the destination channel with the read address of the source channel in a bridge set state in the process of TSA reassignment, the function of having the selector for the destination channel select the read address of the source channel is added in the SEL(S) block 46.

A PC block 48 compares the phase of the write timing from the WCTR block 26 with the phase of the read timing from the RCTR block 44 and, if the write address and read address are close to each other, performs control so that the transfer from the receive frame to the transmit frame is properly accomplished, by issuing an INC/DEC(S) request (stuff request).

Here, in order to interlink the INC/DEC(S) request transmission on the destination channel with the INC/DEC(S) request transmission on the source channel in a bridge set state in the process of TSA reassignment, the function of having the destination channel select the INC/DEC(S) request of the source channel is provided in the SEL(P) block 42.

Figure 4:
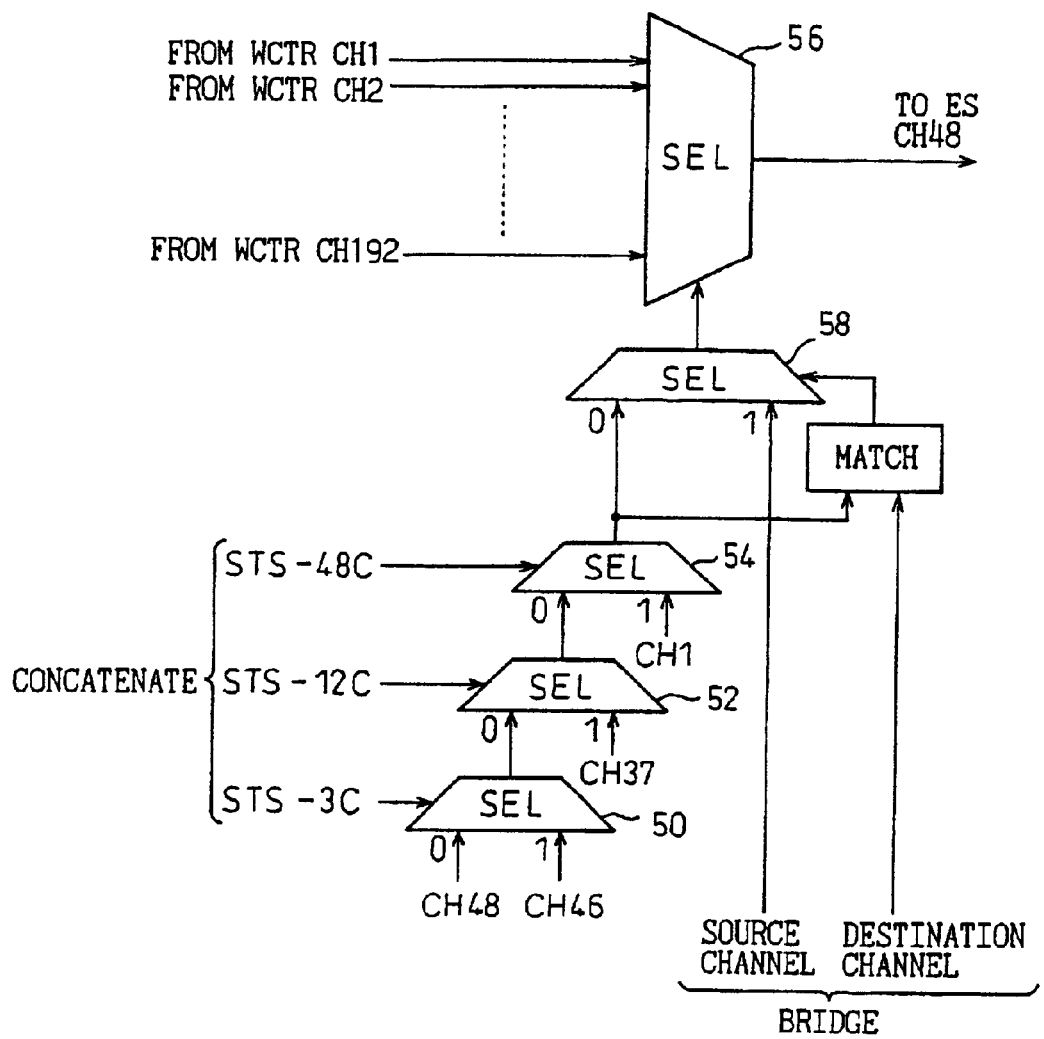
FIG. 4 is a circuit block diagram showing one configuration example of a SEL(R) block 28.

FIG. 4 shows a specific configuration example of a SEL(R) block 28 for CH48 in an STS-192 pointer processing circuit capable of accommodating up to STS-48c by concatenation. Generally, a SEL(R) block for CHm selects the write address of the leading channel of each concatenation in accordance with the concatenation setting states of STS-1, STS-3c, STS-12c, and STS-48c. In the case of CH48, selectors 50, 52, and 54 select channels CH48, CH46, CH37, and CH1 respectively for the concatenation settings of STS-1, STS-3c, STS-12c, and STS-48c, and a selector 56 selects the write address of the selected channel. Further, if the selected channel is specified as the destination channel in the bridge set state, a selector 58 is made to select the write address of the source channel.

The circuit configuration of the SEL(S) block 46 is exactly the same as that described above, and therefore, will neither be shown nor described herein.

Figure 5:
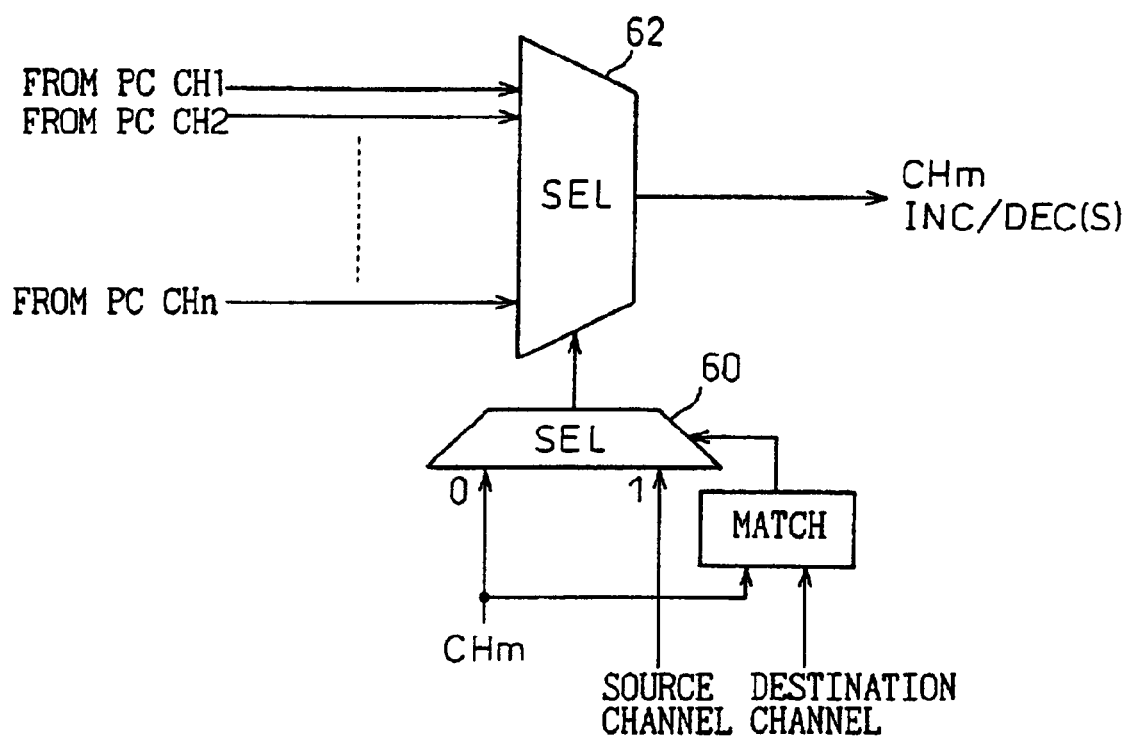
FIG. 5 is a circuit block diagram showing one configuration example of a SEL(P) block 42.

FIG. 5 shows a specific configuration example of a SEL(P) block 42 for CHm in an STS-n pointer processing circuit. The same circuit configuration as employed for the SEL(R) or SEL(S) block, shown in FIG. 4, may be employed for the SEL(P) block but, since, for a concatenated channel, the INC/DEC information is needed only for the leading channel and is not needed for the subordinate channels, the circuit configuration can be simplified as shown. When CHm is specified as the destination leading channel, a selector 60 selects the source leading channel, and a selector 62 selects the INC/DEC(S) information of that channel.

The above pointer circuit configuration can be applied directly to a concatenated signal. For example, for an STS-3c CH2 (STS-1 CH4–6), the conventional (prior art) SEL(R) and SEL(S) blocks perform the following selection.

| ORIGINAL CH | SELECTED CH |
|---|---|
| CH4 | CH4 |
| CH5 | CH4 |
| CH6 | CH4 |

On the other hand, in a bridge set state when performing channel reassignment from an STS-3c CH5 (STS-1 CH13–15) to an STS-3c CH2 (STS-1 CH4–6), the following selection is performed.

| ORIGINAL CH | SELECTED CH |
|---|---|
| CH4 | CH13 |
| CH5 | CH13 |
| CH6 | CH13 |

That is, the circuit configuration of the SEL(R) or SEL(S) block in FIG. 4 accomplishes the function of making the destination channel select the write address or read address of the source leading channel in a bridge set state for TSA reassignment. In this way, by just applying minor modifications and additions to the prior art pointer circuit, a means for accomplishing uninterrupted channel reassignment, including that for a concatenated signal, can be provided, and this constitutes a major feature and advantage of the present invention.

Figure 6:
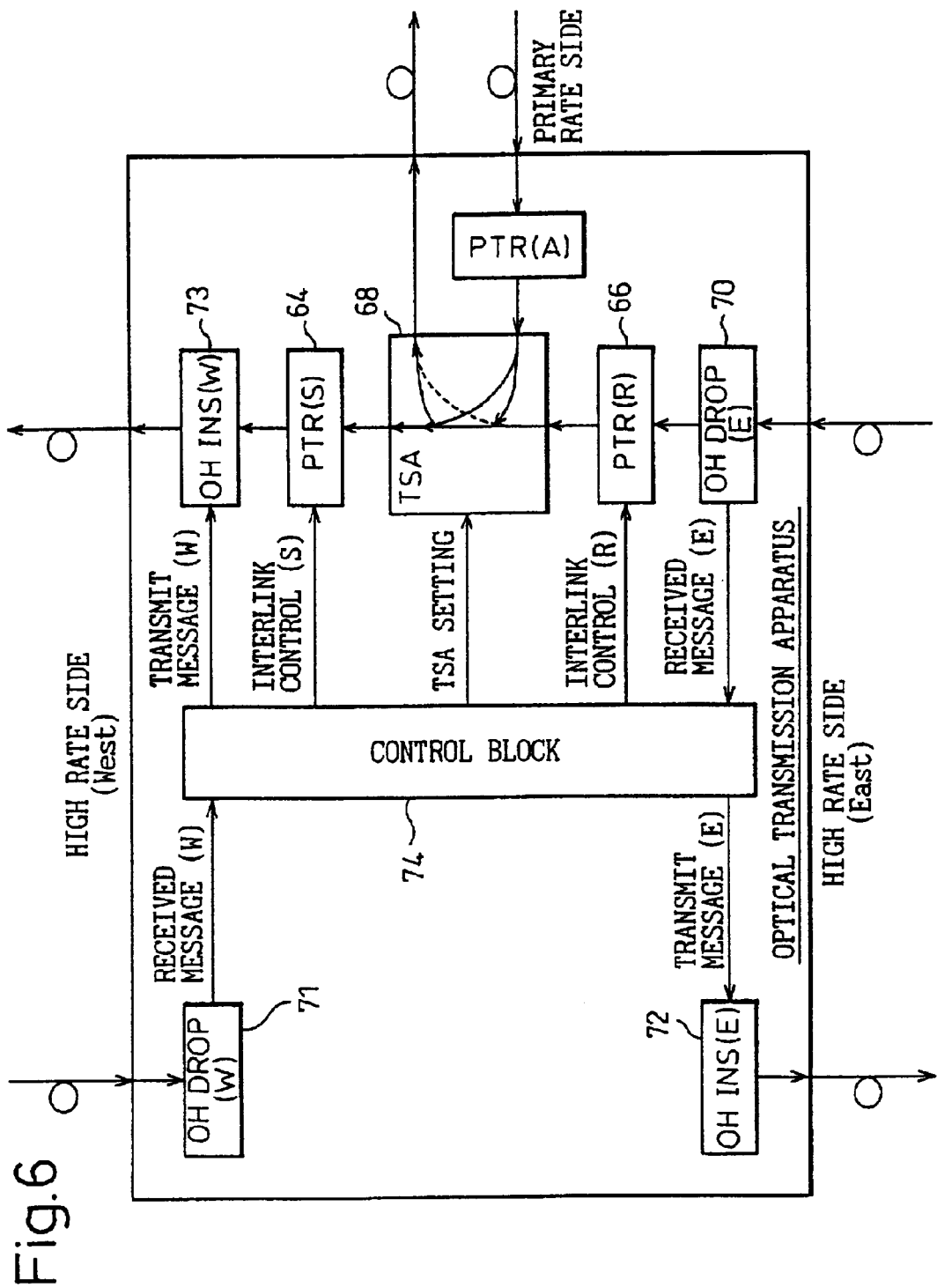
FIG. 6 is a block diagram showing one configuration example of an optical transmission apparatus.

FIG. 6 is a diagram showing, by particularly noting only the east-to-west path, a configuration example of an optical transmission apparatus for carrying out the present invention. Here, a PTR(S) block 64 at the transmitting side is not an essential block for the present invention, but is included in the illustrated example since, in many optical transmission apparatuses, such a pointer circuit is also provided at the transmitting side.

The PTR(R) block 66 and PTR(S) block 64 constitute the basic building blocks of the present invention, as earlier described, and are constructed so that, in the bridge set state, the stuff request transmission and the write/read timing to the ES memory for the destination channel can be interlinked with the pointer processing for the source (leading) channel.

As for the TSA block 68, basically a TSA block in the prior art can be used without modification. However, compared with the prior art TSA function whose processing is based on static settings, the present invention requires the capability to achieve dynamic setting changes while the system is in service; accordingly, the TSA setting (changing) timing must be transferred from the control system clock to the main signal clock. Furthermore, since the cross-connect function for processing large-capacity channels usually uses time division processing, the minimum requirement here is to prevent a momentary line interruption due to a misconnection during a setting change by synchronizing the operation to the (time division) processing timing.

Further, the OH DROP blocks 70 and 71 and OH INS blocks 72 and 73 used in the present invention can perform extraction/insertion for reserved bytes in LOH used as a message in the channel reassignment protocol, in addition to the overhead bytes that the prior art optical transmission apparatus processes.

A control block 74 implements the various monitoring and control functions necessary for uninterrupted channel reassignment, such as the reception of a channel reassignment message from the OH DROP block 70, the transmission of the reassignment message to the OH INS block 73, the interlinking operation setting for the PTR blocks 64 and 66, the bridge setting for the TSA block 68, and the control of switches.

Figure 7:
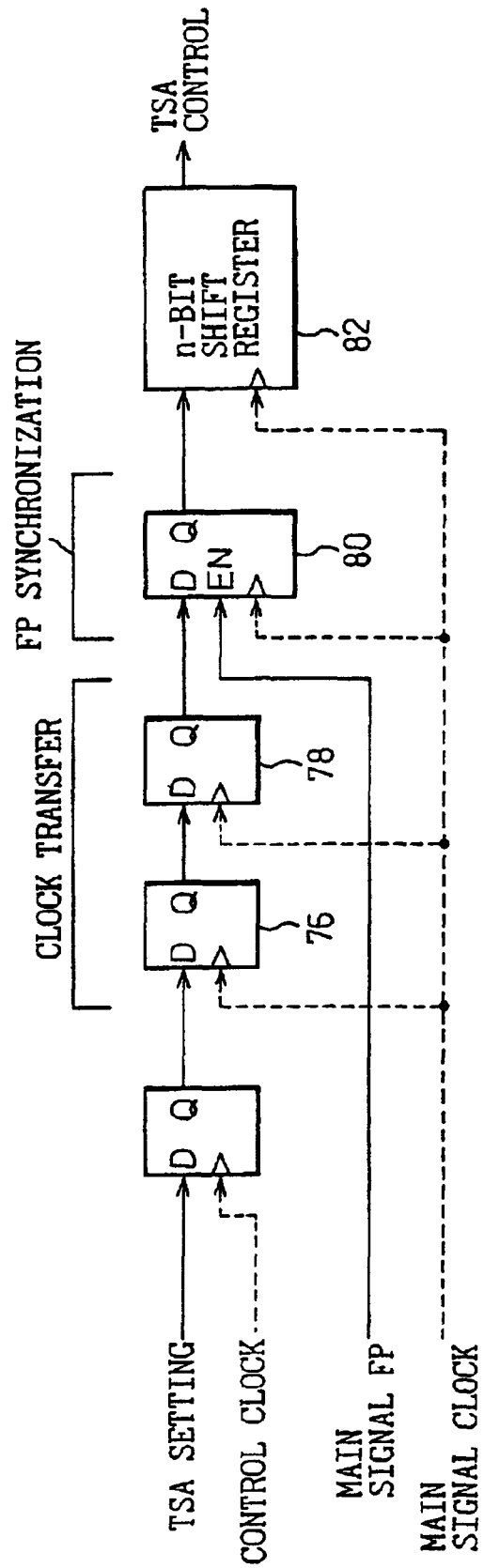
FIG. 7 is a circuit diagram showing one example of a setting timing generating circuit in a TSA processing block 68.

FIG. 7 shows a circuit for generating setting change control timing in the TSA processing block 68. In the present invention, since dynamic setting changes must be made while the system is in service, the TSA setting signal synchronized to the control clock from the control block 74 is transferred to the main signal clock by means of flip-flops 76 and 78, and is synchronized to the main signal FP by means of a flip-flop 80. After that, the TSA setting signal is delayed by n bits through a shift register 82 so that the actual TSA control can be performed during the processing of the A1/A2 bytes in the overhead. In this configuration, if the block for performing TSA on the actual main signal were constructed so that it might generate an error signal while changing the setting, since the fixed pattern "F628h" would be inserted into the A1/A2 frame timing at the transmit end of the apparatus after the TSA processing, the error signal would be confined within the apparatus.

Figure 8:
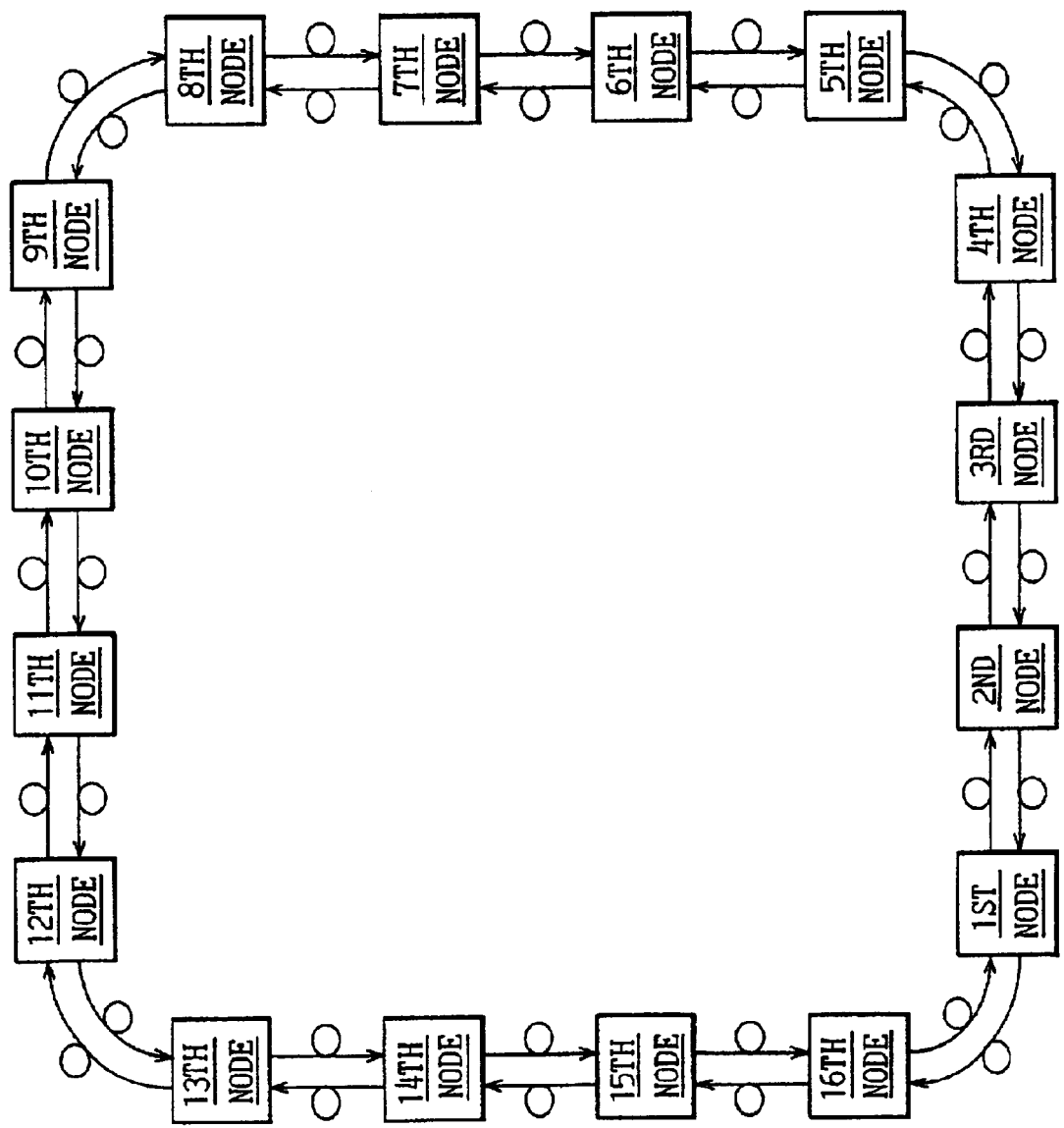
FIG. 8 is a diagram showing an OC-n ring network.

FIG. 8 shows the configuration of an OC-n ring network comprising 16 nodes as one example of the network to which the present invention is applied. To realize uninterrupted reassignment, the respective nodes are assigned node numbers from 1 to 255.

Examples of messages in the uninterrupted channel reassignment protocol in the OC-n ring network shown in FIG. 8 are given in FIGS. 9 to 12. In this embodiment, 6 bytes of Z1#7 to #12 are used considering the application to an OC-12, OC-48, OC-192, or OC-768 ring network consisting of up to 255 nodes. Five kinds of messages for channel reassignment according to the present invention will be described below. Of the 6 bytes of Z1#7 to #12, FIG. 9 explains #7 and #8, FIG. 10 explains #9 and #10, and FIG. 11 explains #11 and #12. FIG. 12 shows the five kinds of messages, A to E, created by combining them.

"No Request" in the message A means a standby state waiting for channel reassignment. Every processing sequence relating to this protocol ends with the bidirectional transmission/reception of this "No Request" message.

"Connection Verification" in the message B is for verifying an end-to-end connection in the network, and is used to verify that all the nodes from the start-point node to the end-point node are in a standby state. This message is sent out from the start-point node.

"Reassignment Request" in the message C is a message that is sent from the start-point node to carry out channel reassignment from a source channel to a destination channel for the section between the start-point node and the end-point node. With this message, the pointer interlinking operation and the TSA switching operation are carried out.

"Clear Request" in the message D is a response that the end-point node returns to acknowledge that it has received the message B or C correctly. With this message, the pointer interlinking operation is cleared.

"Cancel Request" in the message E is a response that the end-point node or an intermediate node that has detected a fault returns in response to the message B or C. With this message, the pointer interlinking operation is cleared and, if necessary, a TSA switch back operation is performed.

A channel reassignment processing sequence using these message is shown in FIGS. 13 and 14. The illustrated example deals with the case where channel reassignment is carried out along the section between the first node as the start-point node and the fourth node as the end-point node. In the figure, the notation B<1,4>, for example, indicates that the message B is transmitted from the first node as the start-point node to the fourth node as the end-point node. The processing sequence according to the invention consists largely of the following four steps.

(1) Transmission of [B] Connection Verification/[C] Reassignment Request from the start-point node to the end-point node.

(2) Transmission of [D] Normal Termination Response/[E] Abnormal Termination Response from the end-point node side to the start-point node.

(3) Clearing of transmit message from the start-point node to the end-point node side.

(4) Clearing of response message from the end-point node side to the start-point node.

In each step, the transmit/response message is continually sent out, and the sequence proceeds to the next step upon detecting a change in the transmit/response message.

The step (1) is performed primarily for the purpose of controlling the pointer circuit interlinking operation in sequence from the start-point node toward the end-point node after the TSA bridge setting to the destination channel is made. By sequentially operating the pointers in interlinking fashion starting from the start-point node, the J1 phase of the destination channel at each intermediate node that received this message is aligned with the J1 phase of the source channel. Therefore, at each intermediate node, after controlling the interlinking operation of the pointer associated with that node, the received message is transferred to the next node. For example, supposing that the intermediate node has the configuration shown in FIG. 6, when the message C is extracted by the OH DROP block 70 from the position of the Z1 byte, the control block 74 controls first the interlinking operation of the PTR(R) block 66, then the interlinking operation of the PTR(S) block 64, for the channel specified in the message, after which the OH INS(W) block 73 inserts the received message C at the position of the Z1 byte.

Further, if broadcast or drop-and-continue, an important application in a ring system, is set, then at a node where the channel to be reassigned is dropped to the primary rate side, even if it is an intermediate node, a switching control in the TSA 68 is carried out for the drop channel as soon as the interlinking operation from the start-point node is established.

The next step (2) is performed primarily for the purpose of clearing the pointer circuit interlinking operation in sequence starting from the end-point node. Here, since the pointer interlinking operation at each node is based on the premise that the J1 phases of the two channels, the source channel and the destination channel, input to that node, exactly match, the operation for clearing it must be performed starting from the end-point node side. Therefore, at each intermediate node, after clearing the interlinking operation of the pointer associated with that node, the received response message is transferred to the next node. For example, supposing that the intermediate node has the configuration shown in FIG. 6, when the message E is extracted by the OH DROP block 71 from the position of the Z1 byte, the control block 74 clears first the interlinking operation of the PTR(S) block 64, then the interlinking operation of the PTR(R) block 66, after which the OH INS(E) block 72 inserts the received message E at the position of the Z1 byte.

At an intermediate node where the channel to be reassigned is dropped to the primary rate side, the drop channel switching control in the TSA 68 may be performed, not in the step (1), but in the step (2). The latter is more advantageous because there is no need to perform a switch back operation if the step (1) is interrupted due to a failure.

The next step (3) is performed for the purpose of clearing the transmit message after clearing the TSA bridge setting at the start-point node. This step is a step for canceling the transmit message of (1), and does not invoke an actual operation in main signal processing.

The final step (4), similarly to the above step, is performed to clear the response message emitted from the end-point node. With this step, the messages in both directions become "No Request", and the node thus enters a standby state to wait for a new message.

The above sequence of operations has been described dealing with the case where the processing is performed normally, but if a request collision occurs or an invalid setting is made during the process, an abnormal termination response is returned in the step (2). In this case, the pointer interlinking operation is cleared in sequence from the fault detecting node toward the start-point node, and if the drop channel switching is already done in the step (1), the TSA drop channel switch back operation is also performed. The start-point node that received the abnormal termination message cancels the TSA bridge setting to the destination channel and moves to the message clearing step.

With the above sequence, uninterrupted TSA reassignment can be automatically carried out by just notifying the target section and the source and destination channels to the start-point node. In addition, the fact that the pointer circuit, which is the key to realizing this function, only needs minor modifications and additions is also a major feature of the present invention.

The above example has dealt with the case where channel reassignment is performed along the entire length of a high rate signal path starting with "add" from primary rate signal lines and ending with "drop" to primary rate signal lines in a ring system. In the present invention, the purpose of explicitly specifying the start-point node and end-point node in the message is to enable channel reassignment to be carried out for only a portion of a high rate signal path. Therefore, when the application is limited to carrying out channel reassignment along the entire high rate signal path from the "add" node to the "drop" node as in the above example, or in the case of a linear system, since the start-point node and end-point node of the channel reassignment coincide with the start-point node and end-point node of the path, the overhead areas of Z1#7 and Z1#8 used in the present invention are not needed.

When performing channel reassignment on a portion of a high rate signal path, for example, when carrying out channel reassignment on the section between the second node and third node along a path of a signal added at the first node and dropped at the fifth node, operation of the third node as the intermediate node is exactly the same as that described in the above example, but since the second node as the start-point node of the channel reassignment is not the start-point node of the path, the TSA block in the second node must be constructed so as to be able to cross-connect a through-path from a high rate side input to a high rate side output.

From the above, the control that the control block performs on the TSA block can be summarized as follows for each of the start-point node, intermediate node, and end-point node.

First, at the start-point node, a bridge setting is lade as the first action in the sequence of operations by setting the input channel, cross-connected to the source channel, also for the destination channel. In this case, the input channel may be an add channel from primary rate side, or may be a through-channel from high rate side.

Next, at each intermediate node, after receiving and detecting the clear request of (2) as a normal termination response, that is, after recognizing that the channel reassignment message has been correctly processed along the section leading from the start-point node to the end-point node, a cross-connect table is searched to determine whether the source channel specified in the channel reassignment request of (1) being continually transferred from the start-point node side is dropped from that intermediate node to the primary rate side, and TSA switching from the source channel to the destination channel is performed on the primary rate channel onto which the source channel is dropped. This switching operation must be performed before clearing the interlinking operation of the receiving-side PTR(R) block 66 (see FIG. 6) in that intermediate node. At this time, since there exist cases where the channel to be reassigned is dropped onto a plurality of primary rate channels, the control block 74 must thoroughly search the cross-connect table for each primary rate channel. However, at any intermediate node of the channel reassignment, the TSA switching operation is not performed on a through-channel from a high rate side to a high rate side. That is, for a through-channel, the input channel is connected straight to an output channel, that is, the source channel is connected to the source channel and the destination channel to the destination channel.

Therefore, at each intermediate node, the control block 74 must determine whether the through-path from the high rate side input to the high rate side output of the TSA block 68 is set straight for each of the source and destination channels. For example, in the earlier described example in which channel reassignment is performed on a portion of a high rate path, after the reassignment the path in the second node is no longer straight; therefore, in this condition, if a request is made for a channel reassignment from CH8 to CH10 along the section starting from the first node and ending at the fourth node, the second node must reject this reassignment request and send a cancel request to the first node. On the other hand, at the end-point node, the through-path for the source channel need not be set straight in the TSA block. Therefore, under the above condition, a request can be made for a channel reassignment from CH8 to CH10 along the section starting from the first node and ending at the second node.

On the other hand, at the end-point node, after the reassignment request of (1) has been received and detected correctly, and the interlinking operations of all the pointer circuits up to the input of the TSA block have been established, every channel on the high rate side and primary rate side of the TSA block to which the specified source channel is cross-connected is identified, and TSA switching from the source channel to the destination channel is performed on every applicable channel. In this case also, since there exist cases where the channel to be reassigned is cross-connected to a plurality of high rate and primary rate channels, the control block must search through cross-connect settings on every channel whether it is a high rate channel or a primary rate channel.

The above sequence of operations has been described dealing with the case where all the processing is performed normally. The description given below deals with the operation when a request collision occurs or when an invalid setting is made.

Figure 15:
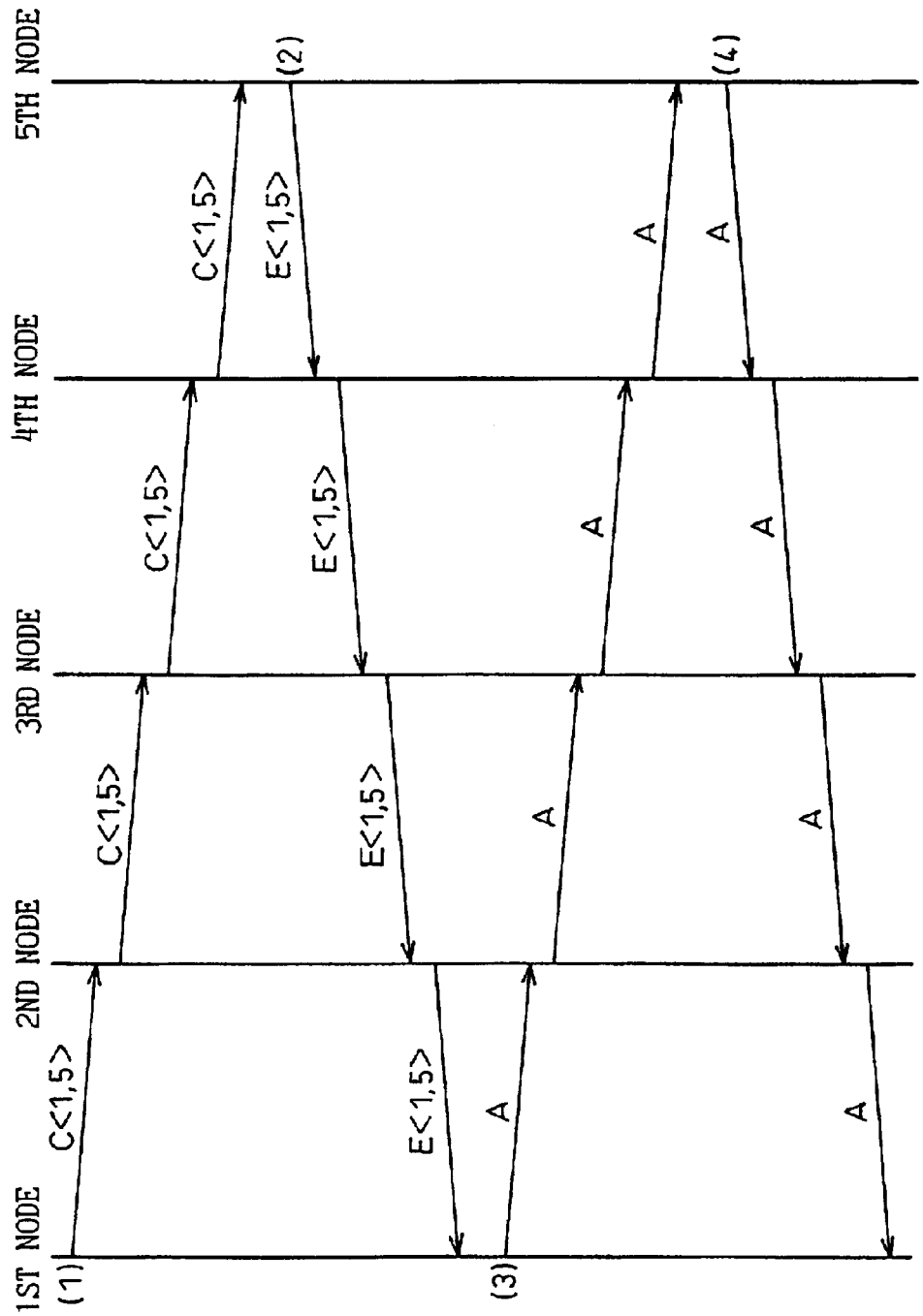
FIG. 15 is a diagram showing an example of a processing sequence in the event of a failure.

FIG. 15 shows a processing sequence for the case where when it is attempted to carry out channel reassignment C<1,5> along the path from the first node as the start-point node to the fifth node as the end-point node via the second, third, and fourth nodes, a fault is detected at the fifth node, i.e., the end-point node. In this case, the pointer interlinking operation at each node, which has once been set by C<1,5> in (1), is cleared by E<1,5> in (2), and the first node as the start-point node that received and detected this response message abandons the channel reassignment and cancels the bridge setting to the destination channel. After that, to reset each node constrained by the messages of (1) and (2), the message A of (3) and the message A of (4) are sent out to set each node back to its initial state, i.e., the standby state.

Figure 16:
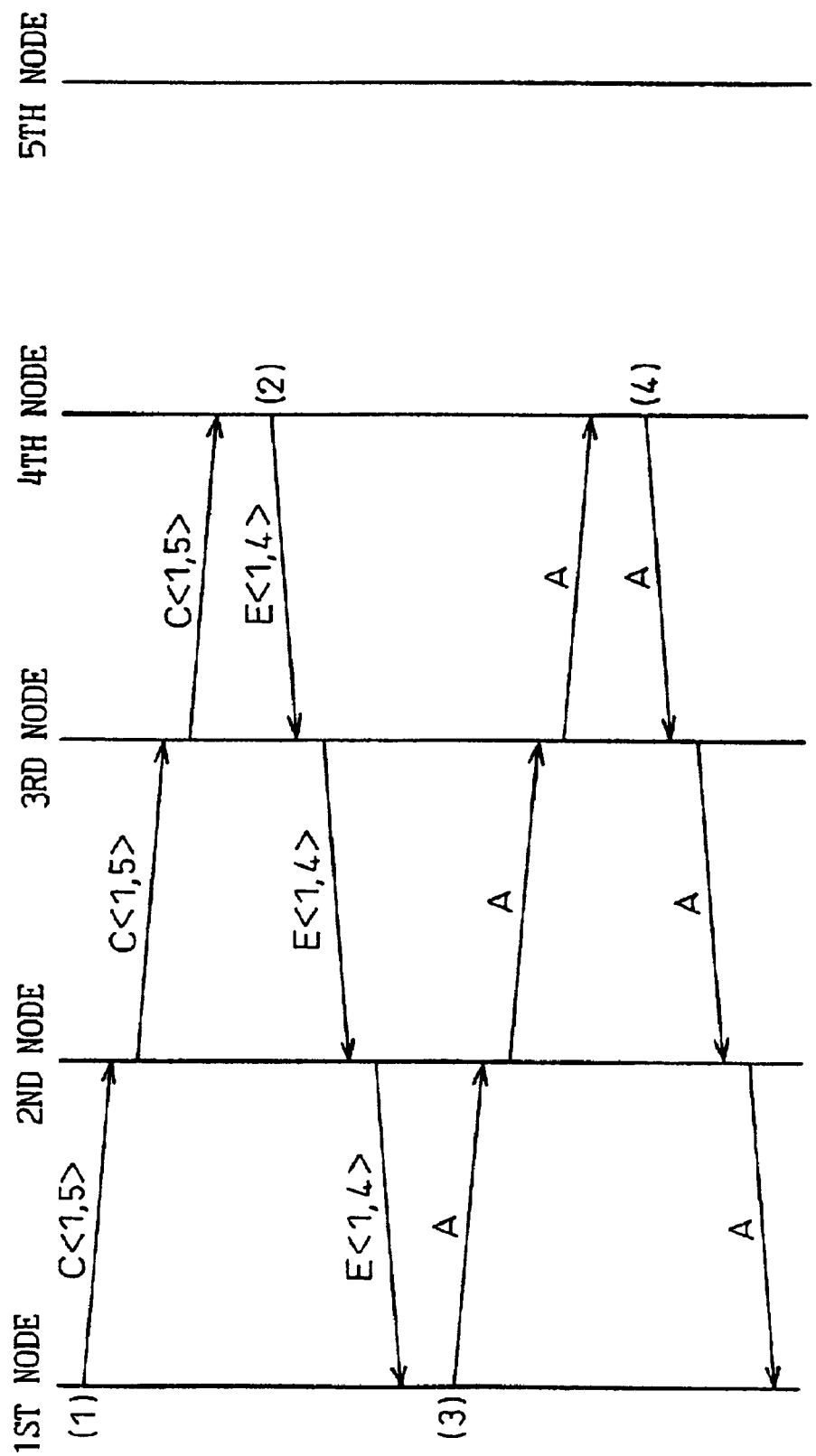
FIG. 16 is a diagram showing an example of a processing sequence in the event of a failure.

FIG. 16 shows a processing sequence for the case where when it is attempted to carry out channel reassignment C<1,5> along the path from the first node as the start-point node to the fifth node as the end-point node via the second, third, and fourth nodes, a fault is detected at the fourth node which is an intermediate node. In this case, the fourth node as the fault detecting node and now acting as the end-point node returns a response using the message E as shown by E<1,4>, thus making it possible for the start-point node to the know where the fault has occurred. Since the fourth node, an intermediate node, acts as the end-point node from the instant the fault is detected, the fourth node can continue to send out E<1,4> in (2) until the message A of (3) is received and detected. On the other hand, each intermediate node only transfers the received message directly to the next node as long as it does not detect a fault and acts as the end-point node.

Figure 17:
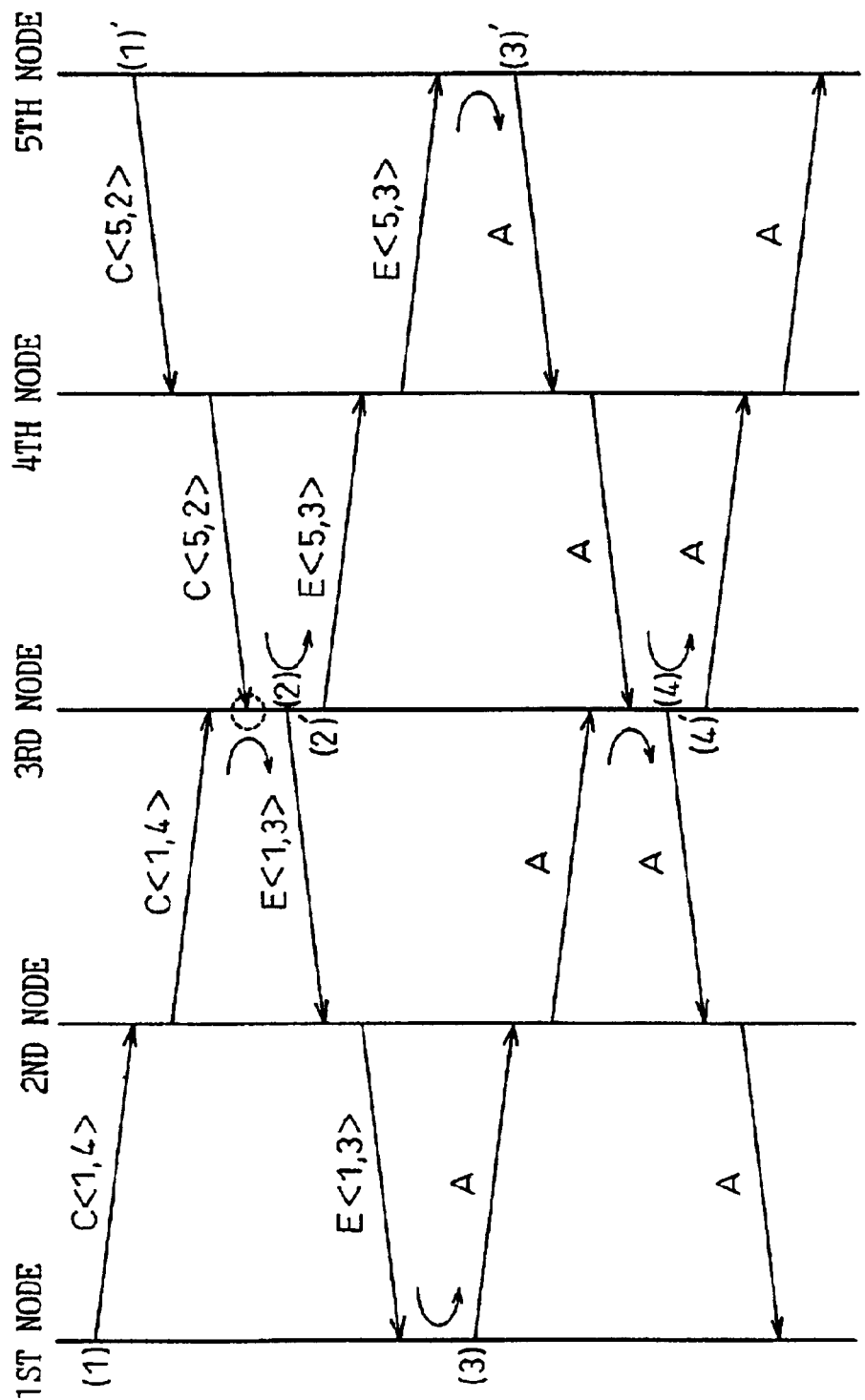
FIG. 17 is a diagram showing an example of a processing sequence in the event of a failure.

FIG. 17 shows a processing sequence for the case where a channel reassignment request C<1,4> on the path from the first node as the start-point node to the fourth node via the second and third nodes collides with a channel reassignment request C<5,2> on the path from the fifth node as the start-point node to the second node via the fourth and third nodes during processing at the third node which is an intermediate node along the two paths. In this case, the third node, which has received and detected C<5,2> during the processing of the earlier received and detected C<1,4>, acts as the end-point node for both messages from the moment that a collision occurs between the two channel reassignment requests, and the third node not only rejects the later received and detected message C<5,2>, but also cancels the processing performed in accordance with the earlier received and detected message C<1,4>and returns a cancel request E<1,3> to the first node and a cancel request E<5,3> to the fifth node. That is, in the event of a message collision, the earlier received message is not given priority, but a cancellation action must be taken for both messages.

Figure 18:
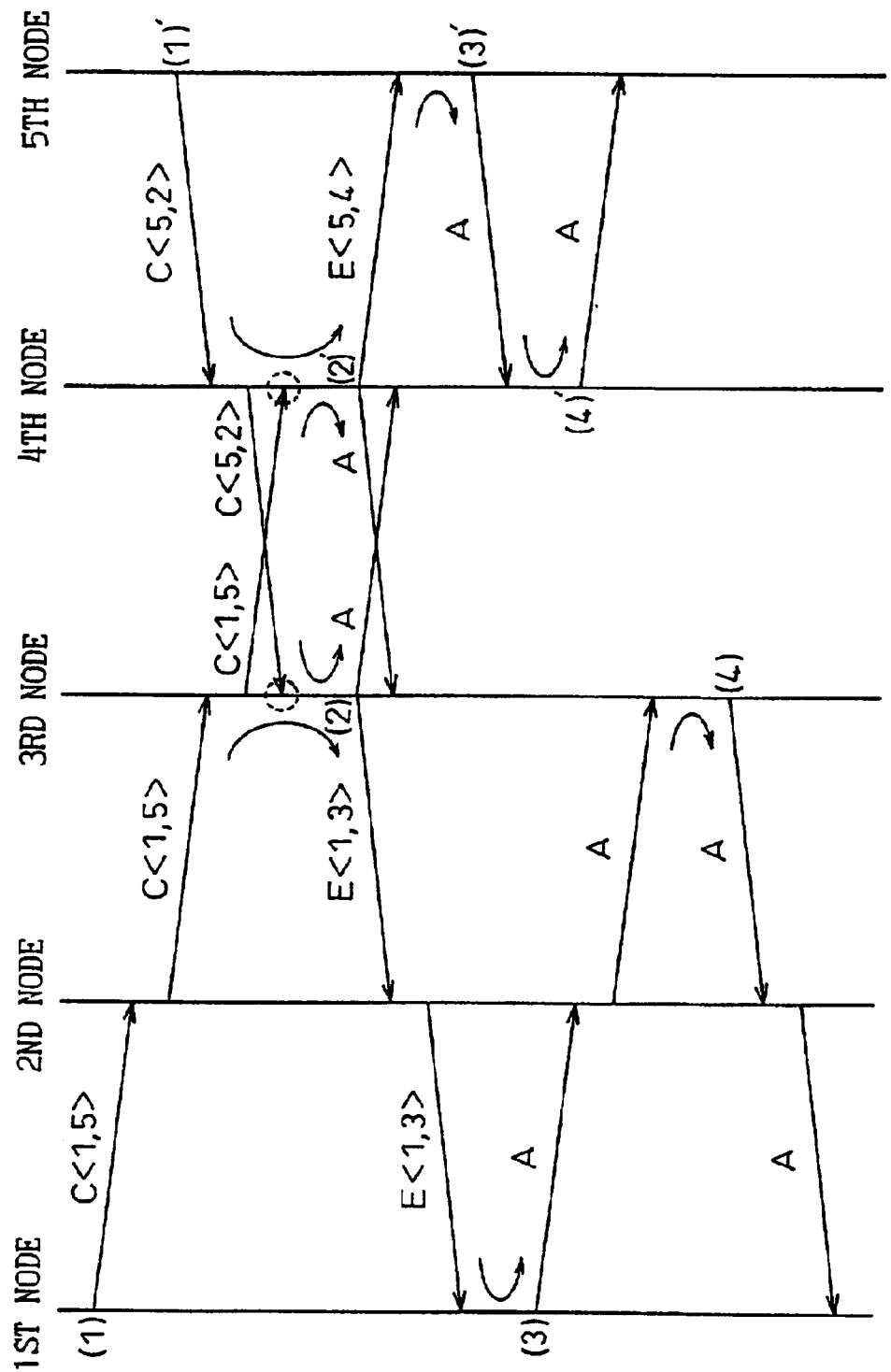
FIG. 18 is a diagram showing an example of a processing sequence in the event of a failure.

FIG. 18 shows a processing sequence for the case where a channel reassignment request C<1,5> on the path from the first node as the start-point node to the fifth node via the second, third, and fourth nodes collides, on a transmission link between the third and fourth nodes, with a channel reassignment request C<5,2> on the path from the fifth node as the start-point node to the second node via the fourth and third nodes. When two messages collide on a transmission link such as the transmission link between the third and fourth nodes, as in this example, after transferring the message of (1) to the next node the message of (1)' is received from that next node. More specifically, the third node receives the message C<5,2> from the fourth node after transferring C<1,5> to the fourth node, while the fourth node receives the message C<1,5> from the third node after transferring C<5,2> to the third node; in this way, the respective nodes independently and almost simultaneously recognize that the two message have collided on the transmission link. In this case, first the third node returns a cancel request E<1,3> to the first node and, at the same time, cancels the message C<1,5> already transferred to the fourth node and corrects it to the message A "No Request". Likewise, the fourth node returns a cancel request E<5,4> to the fifth node and, at the same time, cancels the message C<5,2> already transferred to the third node and corrects it to the message A "No Request". That is, when an intermediate node that transferred the message of (1) has received the message of (1)' instead of the message of (2), the intermediate node transmits the message A "No Request", equivalent to the message of (3), in response to the message (1)', and receives the message A "No Request" apparently equivalent to the message of (4) as the result of the correction applied to the message (1)'. In this way, the basic sequences (1) to (4) of the present invention are maintained at all times regardless of the occurrence of a fault.

As a special example, in a ring system, if there is no end-point node, and if the connection verification B or the reassignment request C in the sequence (1) has returned to the start-point node after cycling around the ring, then in the sequence (2) a message E<start-point node, start-point node> is sent out from the start-point node toward the start-point node around the ring in a direction opposite to that taken in (1).

Optical transmission systems are usually designed with redundant channels or paths. Optical transmission apparatuses also employ redundant configurations with duplicate facilities. The description given above has dealt only with the case of a simple configuration (2+0 system) that does not employ such a redundant channel or apparatus configuration. When performing channel reassignment in a redundant channel configuration, the same channel reassignment as performed on the working side must be performed on the channel at the protection side. In this case, if the channel reassignment is performed on the protection side after completing the channel reassignment on the working side, a misconnection will occur if switching is made from the working to the protection facility for some reason during the process of the channel reassignment.

Figure 19:
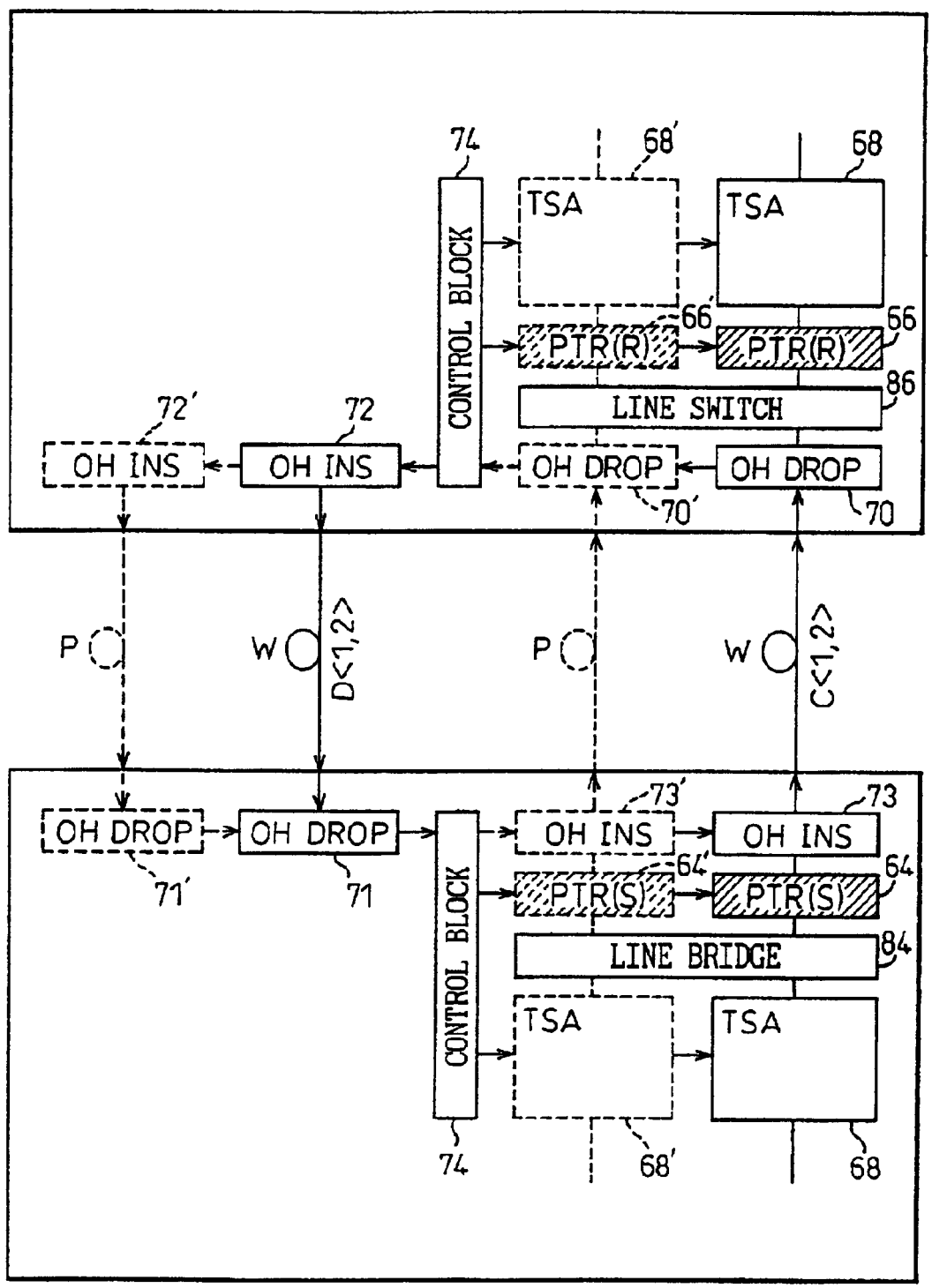
FIG. 19 is a diagram for explaining channel reassignment when a redundant configuration is employed.

Accordingly, when performing channel reassignment on channels in a redundant configuration, it is desirable that the previously described steps (1) to (4) are carried out in parallel between the working and protection facilities, as shown in FIG. 19. In FIG. 19, the same functional blocks as those in FIG. 6 are designated by the same reference numerals, and the functional blocks at the protection side are indicated by like reference numerals followed by "'". A line switch 86 and a line bridge 84 each select an input set at the working side and output it to the working side and the protection side in parallel. When performing channel reassignment, the interlinking operation of the pointer circuits 64, 64', 66, and 66' at the working and protection sides, as indicated by hatching in the figure, is established for the channel designated for reassignment. The messages A to E are inserted only by the working OH INS blocks 72 and 73 or by both the working and protection OH INS blocks 72, 72', 73, and 73', and extracted by the working OH DROP blocks 70 and 71.

In a 1:n system where one protection channel P is provided for many working channels $W_1$ to $W_n$, when a bridge is set between the channel $W_1$ designated for reassignment and the protection channel P, the steps (1) to (4) are carried out on both the protection channel P and the working channel $W_1$ in parallel fashion. When a bridge is not set between the working channel $W_1$ and the protection channel P, the steps (1) to (4) are carried out only on the working channel $W_1$.

The channel reassignment procedures in the 1+1 and 1:n systems described above can be summarized as follows. First, regarding the control of the PTR(S) blocks 64 and 64' at the transmitting side, the same control is performed on the protection channel side as well as the working channel side when a line bridge is set. In this case, for transmission of a message, the message is inserted on both the working and protection channels after performing control for the interlinking operation of both the working and protection PTR(S) blocks 64 and 64'. That is, at the transmitting end node, no account is taken of which channel, the working channel or the protection channel, is selected at the receiving end node. On the other hand, the receiving end node performs processing by detecting the message only on the active channel. The control performed by the control block just described is also applied for 2F-BLSR and 4F-BLSR systems described hereinafter.

Figure 20:
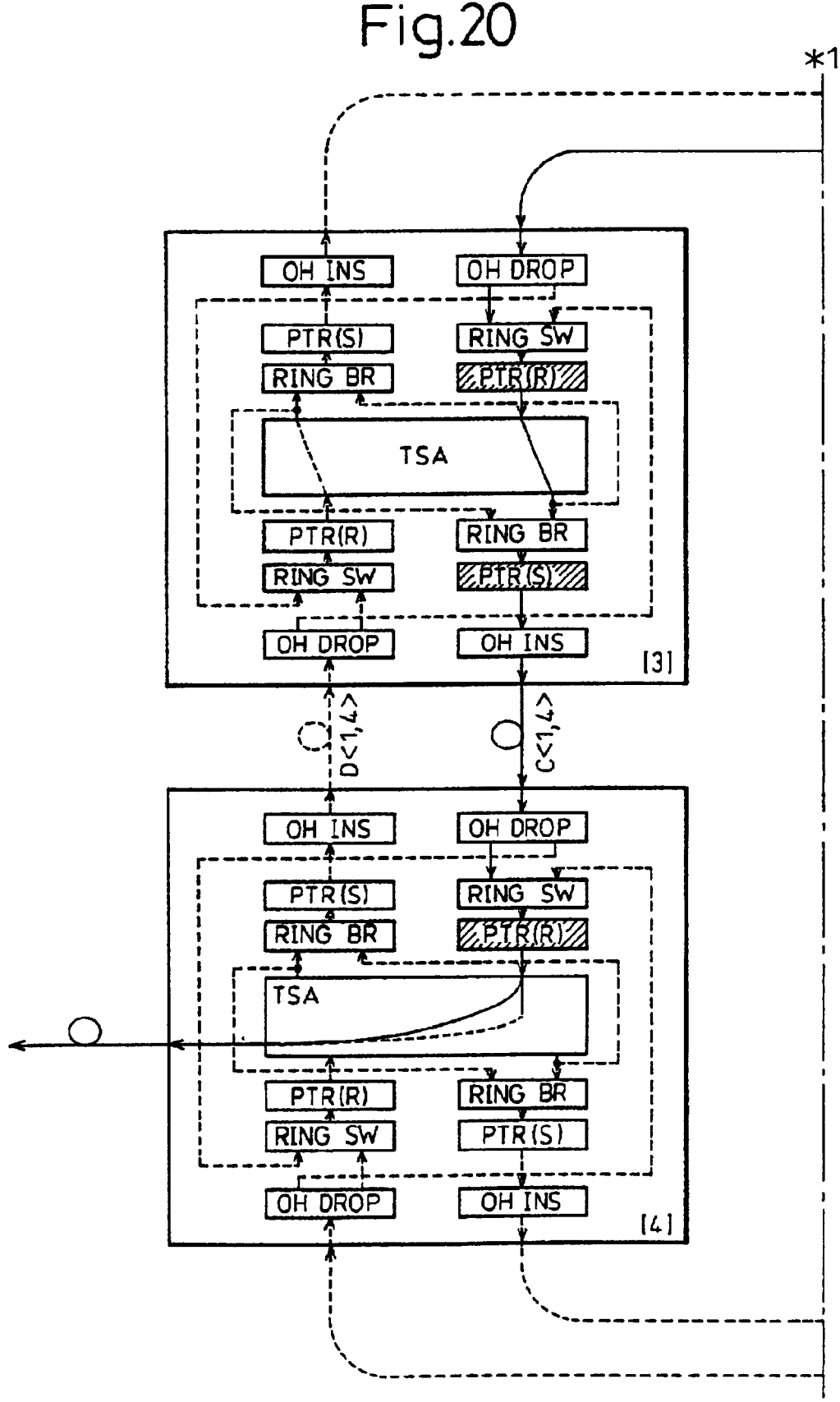
FIG. 20, taken together with FIG. 21, is a diagram for explaining channel reassignment in a 2F-BLSR system.
Figure 21:
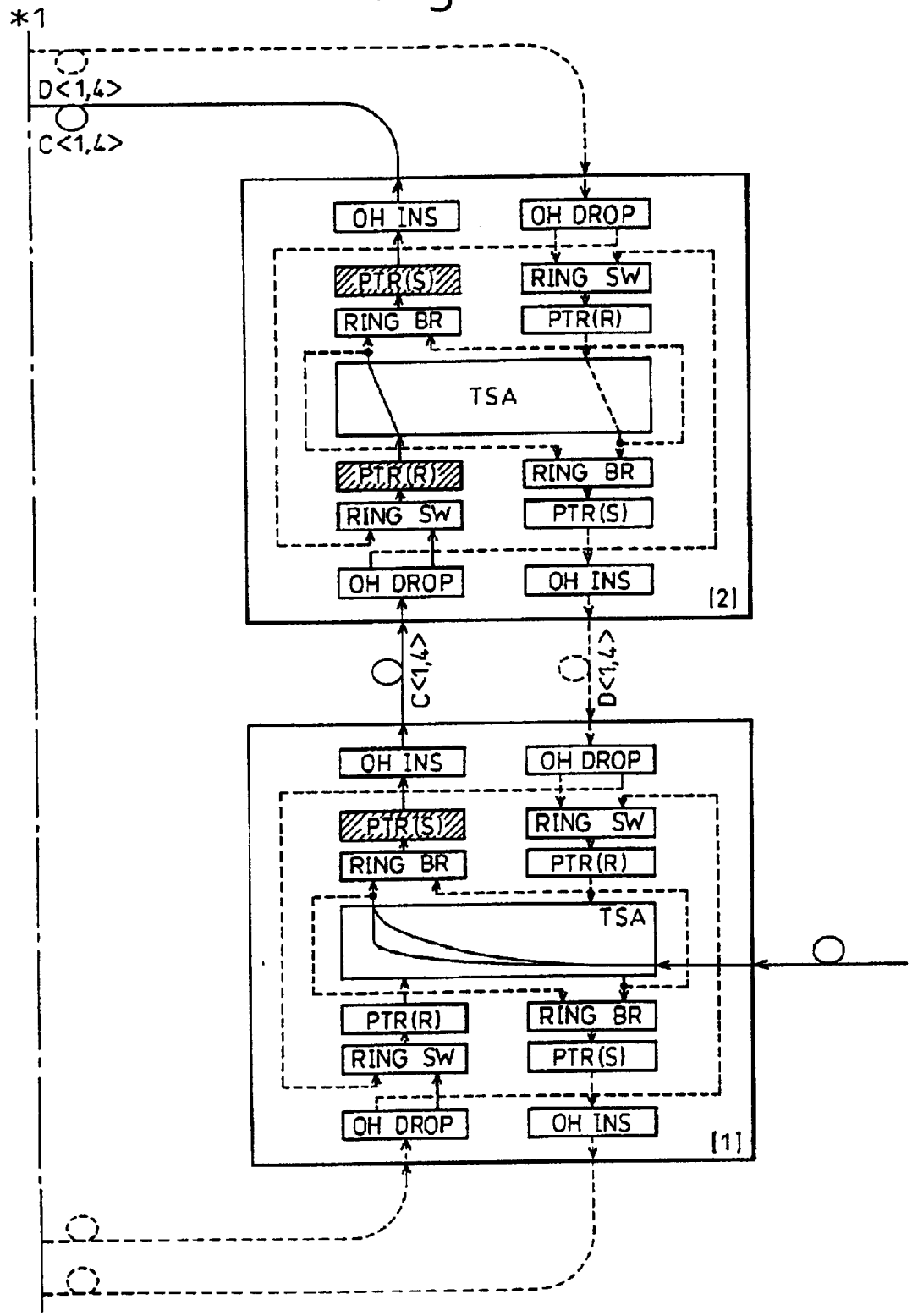
FIG. 21, taken together with FIG. 20, is a diagram for explaining channel reassignment in the 2F-BLSR system.

FIGS. 20 and 21 show an embodiment of channel reassignment in a 2F-BLSR system whose high rate side is OC-n. When the 2F-BLSR is in the normal state (no occurrence of a ring bridge or switch), channel reassignment is performed only on the working channel without regard to the redundant configuration of the network. Channel reassignment is performed on a plurality of channels (or paths) by considering the redundant configuration only when a line bridge (or a path bridge) occurs; in the normal state, therefore, the control performed in the 2F-BLSR system is the same as when no protection channel is provided.

Figure 22:
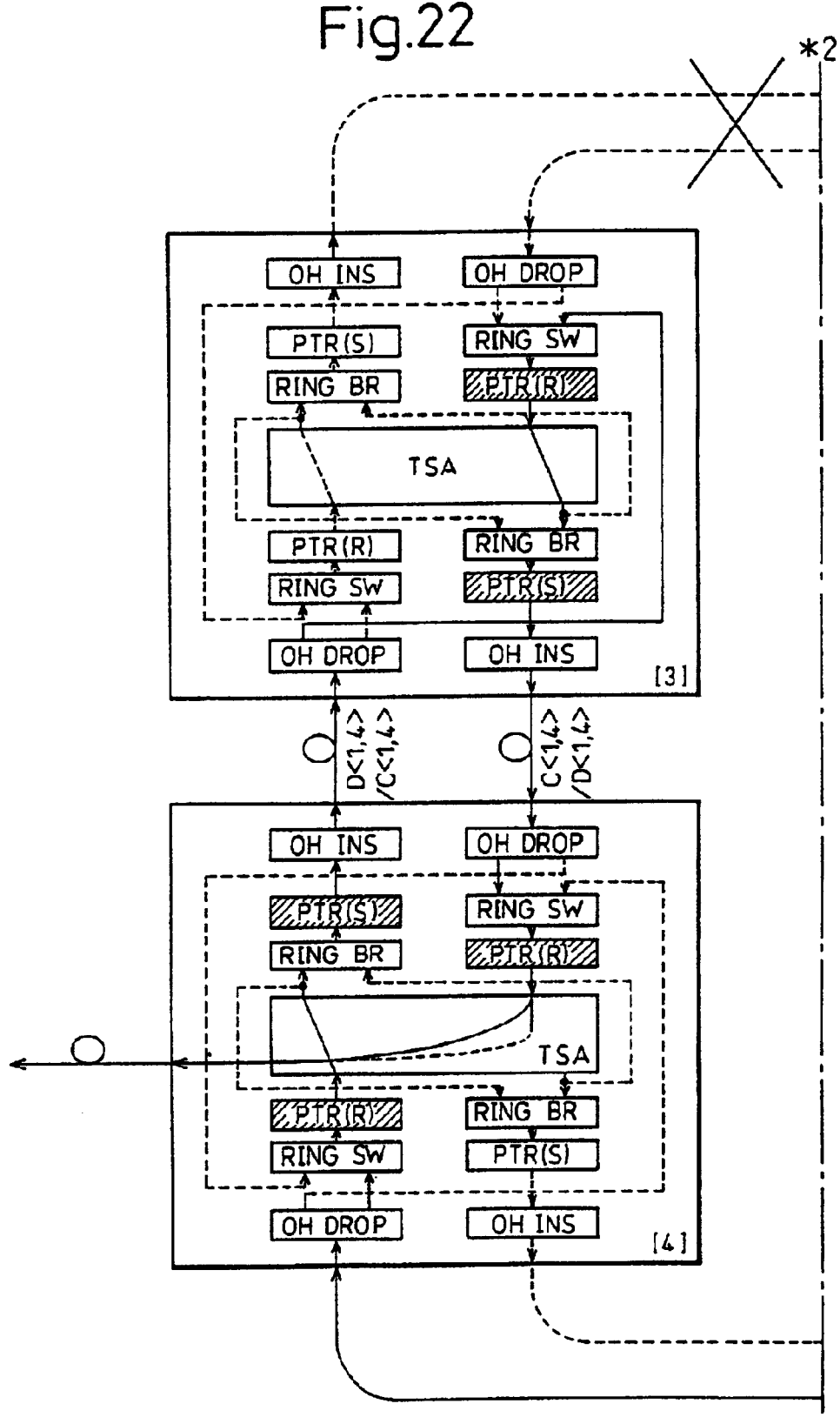
FIG. 22, taken together with FIG. 23, is a diagram for explaining channel reassignment in the 2F-BLSR system.
Figure 23:
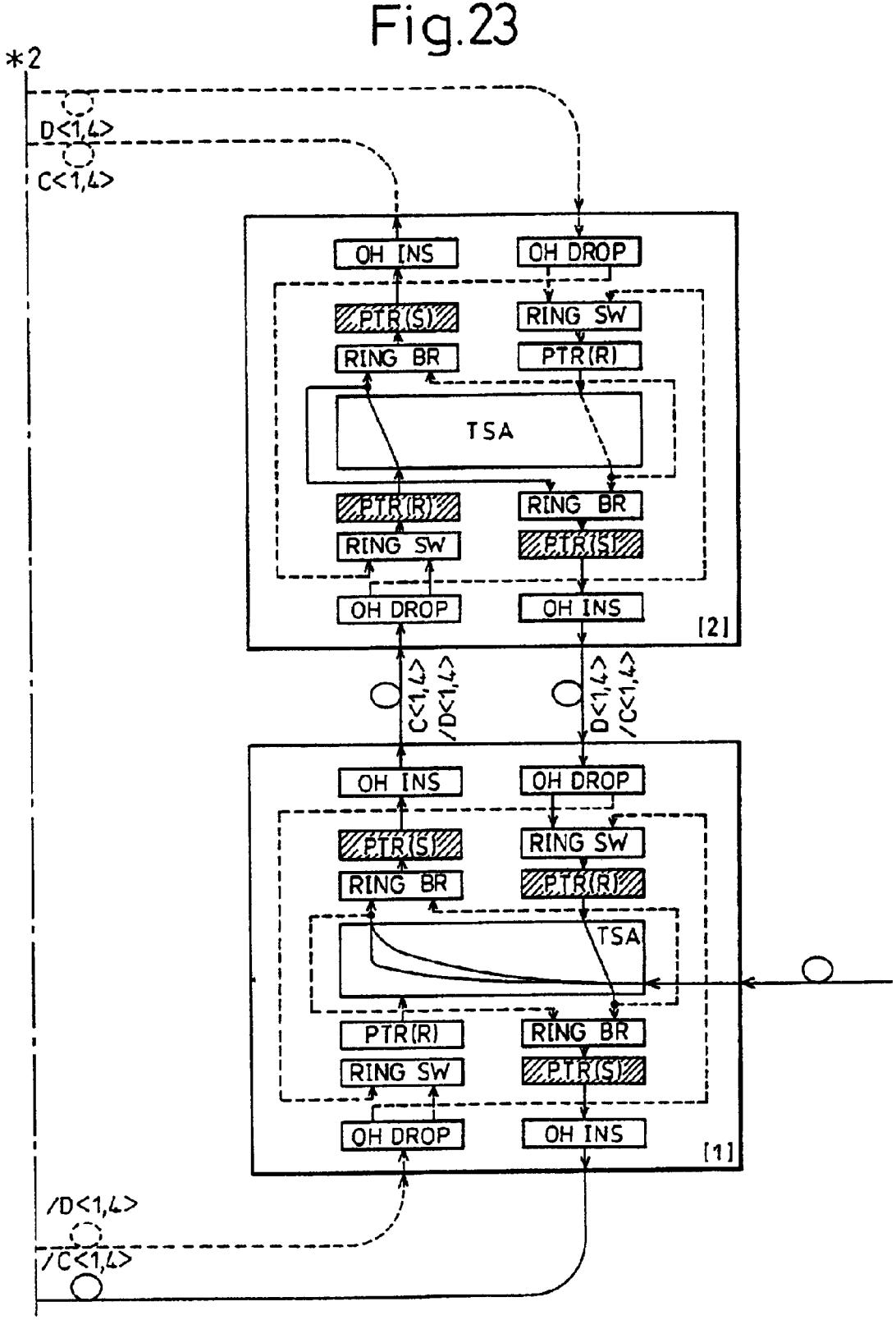
FIG. 23, taken together with FIG. 22, is a diagram for explaining channel reassignment in the 2F-BLSR system.

FIGS. 22 and 23 show an embodiment of the channel reassignment in the OC-n 2F-BLSR system when a failure occurs along the link between the second node (shown by [2] in FIG. 20) and the third node (shown by [3] in FIG. 19) and a ring bridge/ring switch is triggered. When a ring bridge/ring switch occurs in the 2F-BLSR system, the six bytes of Z1#7 to #12 assigned for transmission of channel reassignment messages are not sufficient for the purpose. This is because, in 2F-BLSR, the working and protection channels are time-division multiplexed on the same physical line; in 4F-BLSR, this does not become a problem. Therefore, in addition to Z1#7 to #12, the same function is assigned to Z2#7 to #12 in order to enable uninterrupted channel reassignment in the event of the occurrence of a ring bridge/ring switch in 2F-BLSR. Here, the newly added Z2#7 to #12 are defined in accordance with FIGS. 9 to 12, and Z1#7 to #12 are used for the working channel and Z2#7 to #12 for the protection channel.

Here, denoting the source channel and destination channel by CHs and CHd, respectively, the signal added on CHs and CHd by the TSA bridge setting at the first node is transmitted to the second node in the usual manner. The channel reassignment request message sent out to the second node at this time will be designated by C<1,4;s,d>/A. At the second node, a ring bridge is triggered and, on the working channel directed to the third node, the interlinking operation of CHs/CHd for the transmitting PTR(S) is set and the channel reassignment message C<1,4;s,d>/A is transferred. On the other hand, on the protection channel directed to the first node, the interlinking operation of CH(s+n/2)/CH(d+n/2) for the transmitting PTR(S) is set and the channel reassignment message A/C<1,4;s,d> is transferred. In the pass-through direction of the first node that received this message, the interlinking operation of CH(s+n/2)/CH(d+n/2) is set and the message A/C<1,4;s,d> is transferred to the fourth node. Likewise, at the fourth node, the interlinking operation of CH(s+n/2)/CH(d+n/2) is set and the message A/C<1,4;s,d> is transferred to the third node. At the third node which is a ring switch node, either C<1,4;s,d>/A from the second node or A/C<1,4;s,d> from the fourth node is detected, depending on the selection of the ring switch, and the interlinking operation of CHs/CHd is set. Then, the message C<1,4;s,d>/A is transferred on to the fourth node. The fourth node receives and detects this message and, after setting the interlinking operation of CHs/CHd, carries out TSA drop channel switching.

After carrying out the TSA switching, the fourth node returns a clear request message toward the first node; first, D<1,4>/C<1,4;s,d> is returned to the third node. The third node that detected this message transfers the message D<1,4>/A to the second node and the message C<1,4;s,d>/D<1,4> to the fourth node. The fourth node that received the latter message transfers the message A/D<1,4> to the first node which then transfers the message C<1,4;s,d>/D<1,4> to the second node. The second node selects either D<1,4>/A from the third node or C<1,4;s,d>/D<1,4> from the first node, depending on the ring switch setting at that time, and transfers the message D<1,4>/C<1,4;s,d> to the first node.

Next, the application of uninterrupted channel reassignment in a 4F-BLSR system will be described. First, when a span/ring bridge/switch is not triggered (including the case where PCA (Protection Channel Access) is being made), the same control as performed in a system having no protection channel is performed, as in the case of the 2F-BLSR system.

Next, when a span bridge or span switch occurs (including the normal state when PCA is not supported), if a line bridge is set, the transmitting PTR(S) on the protection channel side is controlled in the same manner as that on the working channel side, as in the case of the 1+1 system. For the transmission/transfer of a message in this case, the message is inserted on both the working channel and protection channel after controlling the interlinking operation of the PTR(S) blocks on both channels. That is, at the transmitting end node, no account is taken of which channel, the working channel or the protection channel, is selected at the receiving end node. On the other hand, the receiving end node performs processing by detecting the message only on the active channel.

Figure 24:
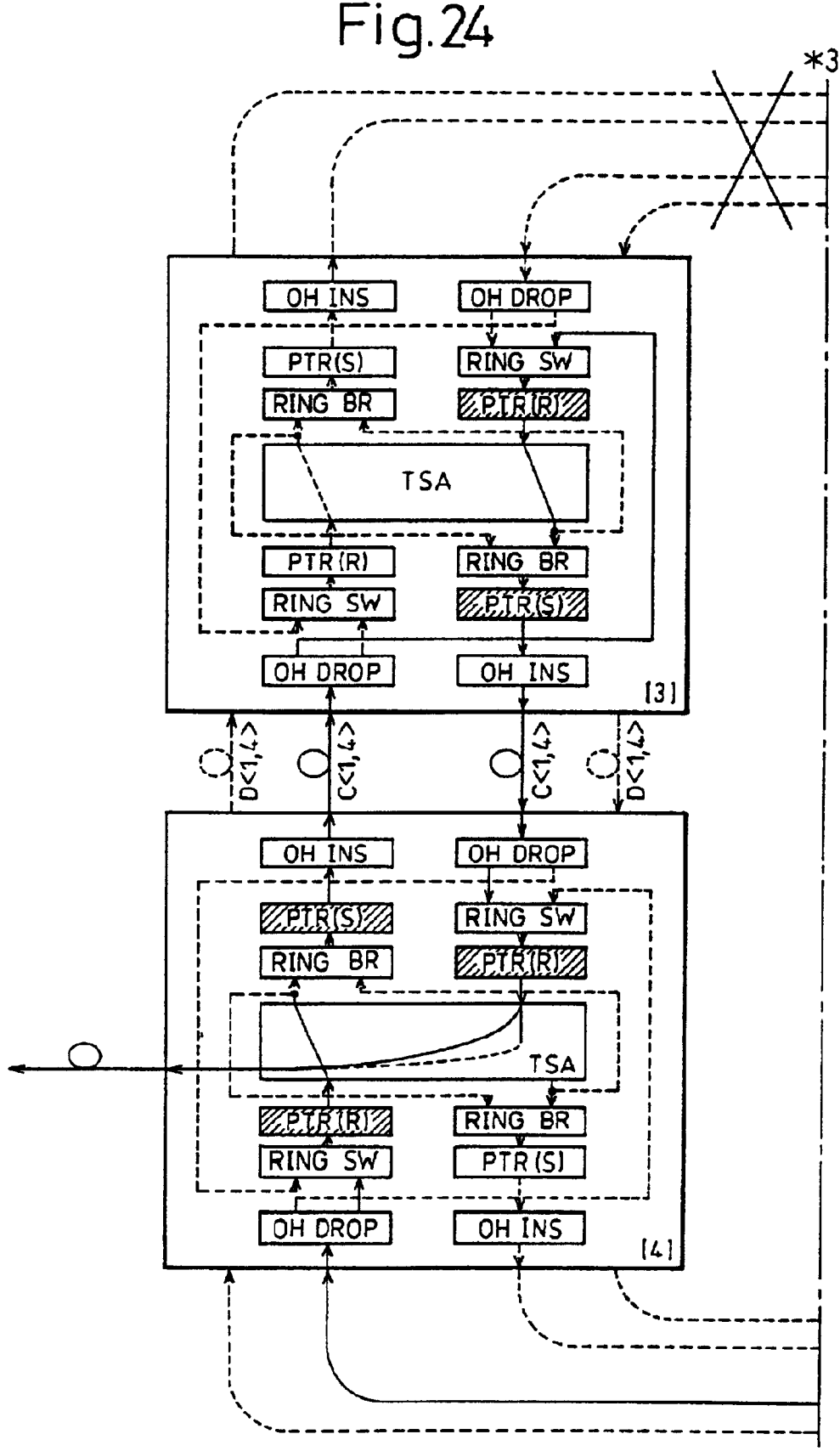
FIG. 24, taken together with FIG. 25, is a diagram for explaining channel reassignment in a 4F-BLSR system.
Figure 25:
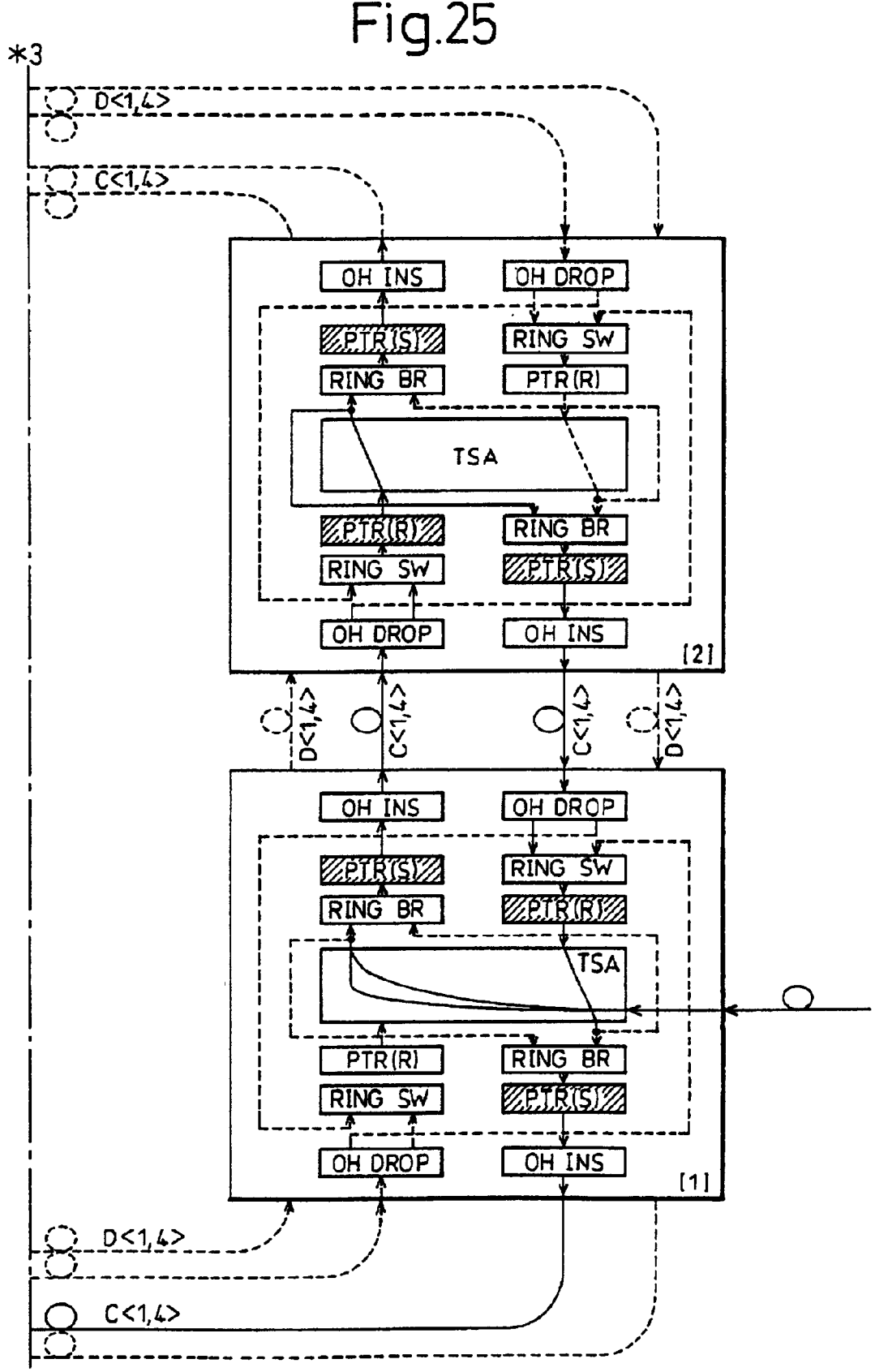
FIG. 25, taken together with FIG. 24, is a diagram for explaining channel reassignment in the 4F-BLSR system.

When a ring bridge or ring switch occurs, control similar to that performed in the 2F-BLSR system is performed as shown in FIGS. 24 and 25.

Denoting the source channel and destination channel by CHs and CHd, respectively, the signal added on CHs and CHd by the TSA bridge setting at the first node is transmitted to the second node by using the working channel in the usual manner. The channel reassignment request message sent out to the second node at this time is C<1,4>. At the second node, a ring bridge is triggered and, on the working channel directed to the third node, the interlinking operation of CHS/CHd for the transmitting PTR(S) is set and the channel reassignment message C<1,4> is transferred. On the other hand, on the protection channel directed to the first node, the interlinking operation of CHs/CHd for the transmitting PTR(S) is likewise set and the channel reassignment message C<1,4> is transferred. In the pass-through direction of the first node that received and detected this message, the interlinking operation of CHs/CHd is set and the message C<1,4> is transferred to the fourth node by using the protection channel. Likewise, at the fourth node, the interlinking operation of CHs/CHd is set and the message C<1,4> is transferred to the third node. At the third node which is a ring switch node, either C<1,4> from the working channel on the second node side or C<1,4> from the protection channel on the fourth node side is detected, depending on the selection of the ring switch, and the interlinking operation of CHs/CHd is set. Then, the message C<1,4> is transferred on to the fourth node by using the working channel. The fourth node receives and detects this message and, after setting the interlinking operation of CHs/CHd, carries out TSA drop channel switching.

After carrying out the TSA switching, the fourth node returns a clear request message toward the first node; first, D<1,4> is returned to the third node along the working channel. The third node that detected this message transfers the message D<1,4> to the working channel on the second node side and also to the protection channel on the first node side. The fourth node that received the latter message transfers the message D<1,4> to the protection channel on the first node side, and the first node transfers the message D<1,4> to the protection channel on the second node side. The second node selects either D<1,4> from the working channel on the third node side or D<1,4> from the protection channel on the first node side, depending on the ring switch setting at that time, and transfers the message D<1,4> to the working channel on the first node side.

Finally, the application of uninterrupted channel reassignment in a UPSR system will be described.

Figure 26:
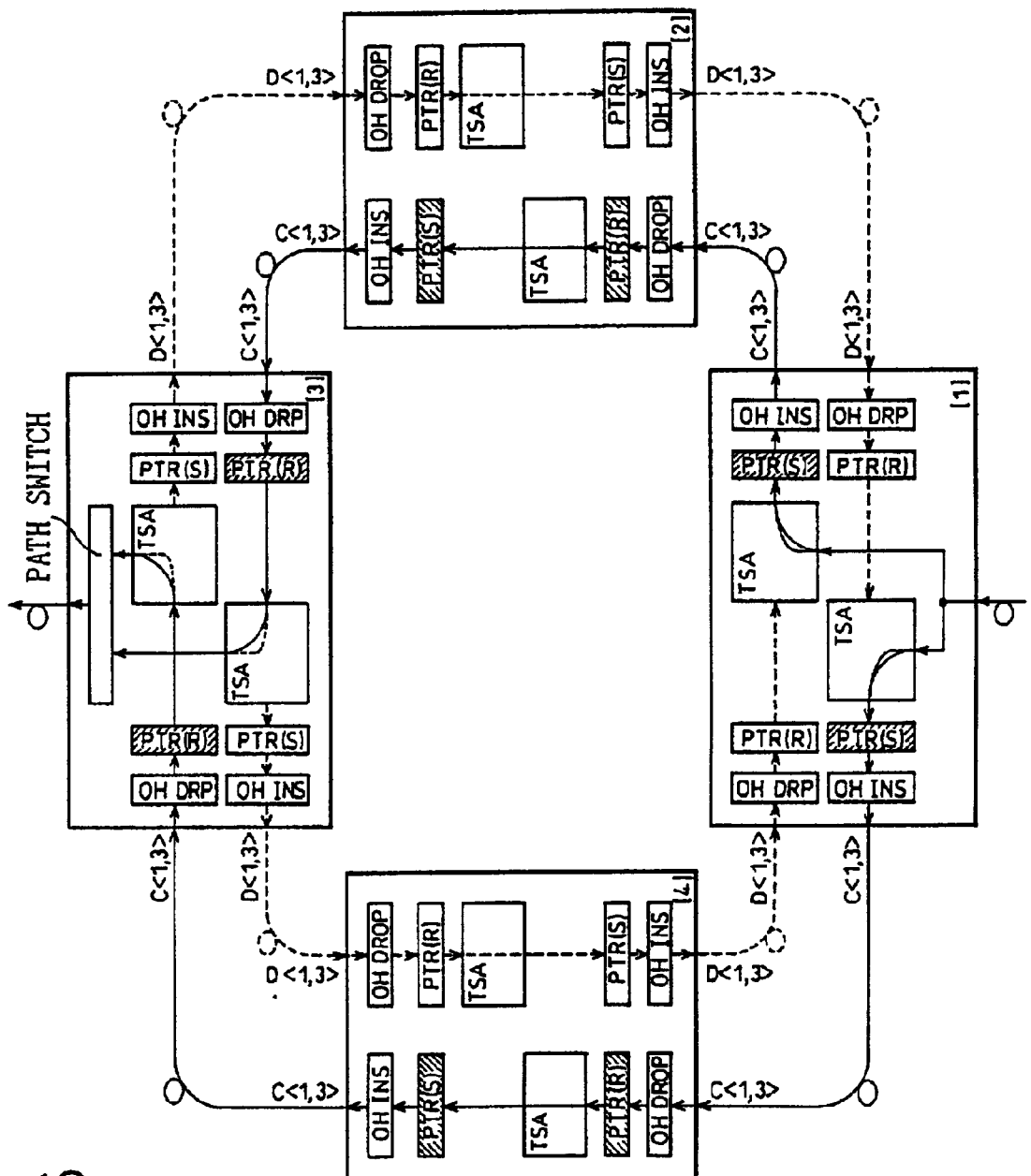
FIG. 26 is a diagram for explaining channel reassignment in a UPSR system.

In the case of an optical transmission apparatus in which a path switch is located on the tributary side of the TSA, that is, a path switch is provided exclusively for each tributary channel, as shown in FIG. 26, channel reassignment on the east-to-west path and channel reassignment on the west-to-east path are respectively independent events. Accordingly, control and message transfers similar to those in a system having no protection channel are performed on the respective paths independently of each other. In an extreme case, it is possible to perform channel assignment only on the east-to-west path or the west-to-east path.

Figure 27:
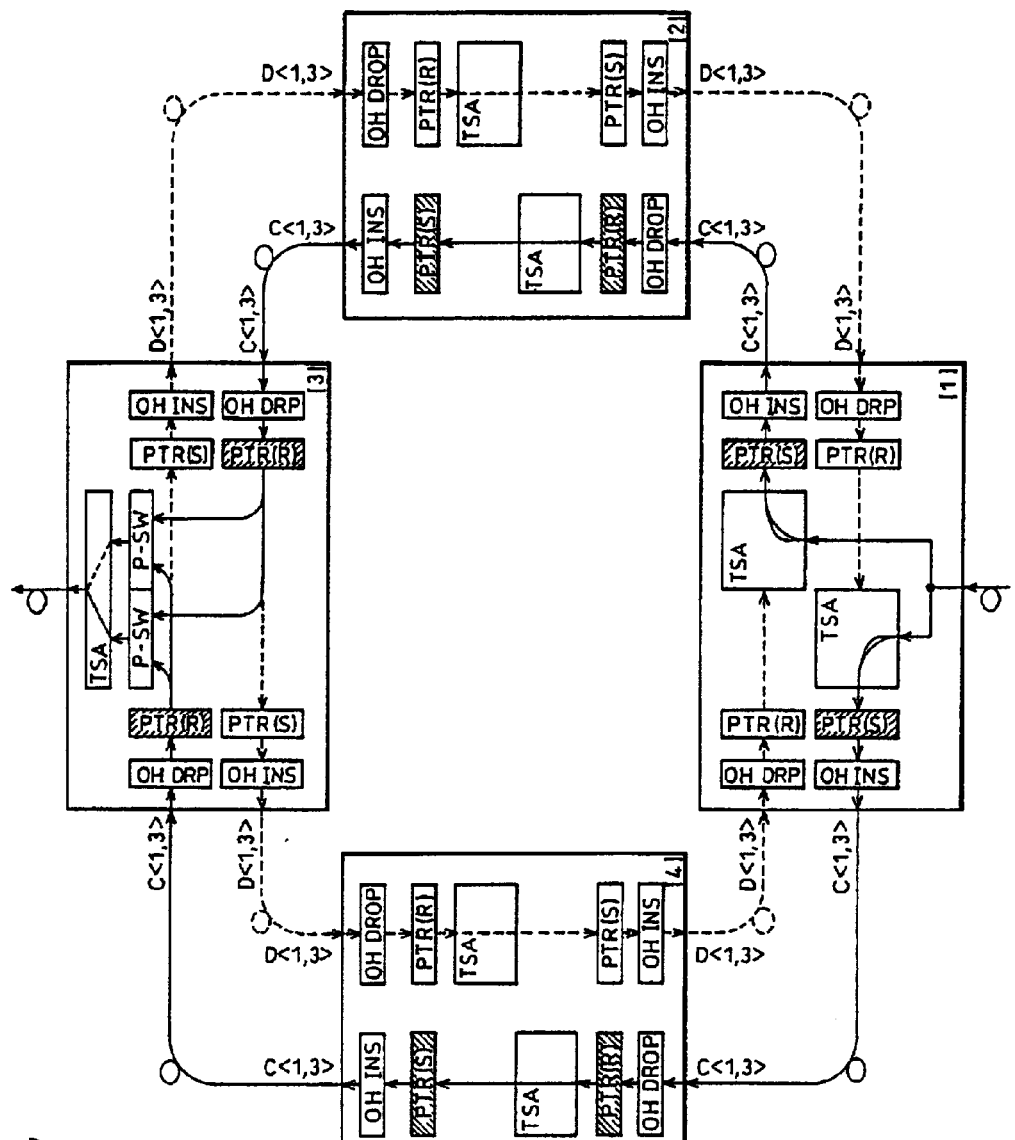
FIG. 27 is a diagram for explaining channel reassignment in a UPSR system.

On the other hand, FIG. 27 shows an embodiment of the channel reassignment performed in an UPSR system in which the TSA is located on the tributary side of the path switch. When a path switch is provided for each high rate channel, as in this example, channel reassignment on the east-to-west path and channel reassignment on the west-to-east path cannot be performed independently of each other. Therefore, the condition for TSA drop channel switching at the third node is (1) the reassignment request is received from both directions or (2) the reassignment request is received from one direction and the signal from the other direction is an AIS-P. Further, the direction of the path switch for the source channel and that for the destination channel must be made to match each other and this condition must be maintained until the time immediately before effecting the drop channel switching.

As described above, the present invention offers the effect of being able to carry out the reassignment of TSA uninterruptedly in various application systems such as 1+1, 2+0 (with no protection channel), 1:n, 2F-BLSR, 4F-BLSR, UPSR, etc. Achieving such uninterrupted channel reassignment greatly contributes to the construction of high-reliability flexible networks or to the efficient utilization of channels, since it makes possible the reassignment of existing service channels that becomes necessary to consolidate concatenated areas because of the addition of new channel services which are offered using concatenated signals and for which the demand has been increasing in recent years.

What is claimed is:

1. A channel reassignment method comprising the steps of:
   (a) at a starting point of a reassignment section, making a bridge setting for transmitting a signal on a source channel also onto a destination channel;
   (b) interlinking a pointer operation of a first pointer circuit in said destination channel with a pointer operation of a second pointer circuit in said source channel;
   (c) switching the signal from the source channel to the destination channel after performing steps (a) and (b);
   (d) clearing the pointer interlinking operation effected in step (b) after performing step (c); and
   (e) clearing the bridge setting made in step (a) after performing step (c).

2. A channel reassignment method comprising the steps of:
   (a) at a starting point of a reassignment section, making a bridge setting for transmitting a signal on a source channel also onto a destination channel;
   (b) interlinking the pointer operation of said destination channel with said source channel in all pointer circuits located along said reassignment section;
   (c) switching the signal from the source channel to the destination channel after performing steps (a) and (b);
   (d) clearing the pointer interlinking operation effected in step (b) after performing step (c); and
   (e) clearing the bridge setting made in step (a) after performing step (c);
   and further comprising the steps of:
   sending a first message to an end point of the reassignment section from the starting point; and
   sending a second message from the end point to the starting point in response to the first message, and wherein:
   step (b) is performed by being triggered by the first message, and
   step (d) is performed by being triggered by the second message.

3. A method according to claim 2, wherein
   step (b) is performed at each point located along the reassignment section, step (b) comprising the substeps of:
   (i) initiating the pointer interlinking operation upon reception of the first message; and
   (ii) transferring the first message after initiating the pointer interlinking operation, and
   step (d) is performed at each point located along the reassignment section, step (d) comprising the substeps of:
   (i) clearing the pointer interlinking operation upon reception of the second message; and
   (ii) transferring the second message after clearing the pointer interlinking operation.

4. A method according to claim 2, wherein step (c) is performed at each point located along the reassignment section by being triggered by the second message.

5. A method according to claim 1, wherein steps (a), (b), (c), (d), and (e) are performed on both a working channel and a protection channel in parallel fashion.

6. A pointer circuit for performing pointer processing between receiving and transmitting ends of a plurality of channels, the pointer circuit comprising for each channel:

an ES memory temporarily storing payload data of each channel;

a phase comparator generating a stuff request by comparing a write address and read address for the ES memory; and a pointer determining unit determining a pointer at the transmitting end based on the stuff request, wherein the pointer circuit further comprises for each channel:

first and second selectors selecting, for a destination channel, a write address and a read address of a source channel as the write address and the read address for the ES memory at the time of channel reassignment, and supplying the selected write address and read address to the ES memory; and a third selector selecting, for the destination channel, a stuff request of the source channel as the stuff request, and supplying the selected stuff request to the pointer determining unit.

7. A pointer processing circuit according to claim 6, wherein the first and second selectors further select, for each of concatenated channels, a write address and a read address of a leading channel of the concatenated channel as the write address and read address, and selects, for each of concatenated destination channels, the write address and read address of a leading channel of the concatenated destination channel as the write address and read address for the ES memory.

* * * * *